US007849986B2

(12) United States Patent
Kitou et al.

(10) Patent No.: US 7,849,986 B2
(45) Date of Patent: Dec. 14, 2010

(54) HYDRAULIC PRESSURE CONTROL APPARATUS

(75) Inventors: Masasumi Kitou, Nagoya (JP); Makoto Futamura, Ayase (JP)

(73) Assignee: Nissan Motor Co., Ltd., Yokohama (JP)

( * ) Notice: Subject to any disclaimer, the term of this patent is extended or adjusted under 35 U.S.C. 154(b) by 858 days.

(21) Appl. No.: 11/754,577

(22) Filed: May 29, 2007

(65) Prior Publication Data
US 2008/0006029 A1    Jan. 10, 2008

(30) Foreign Application Priority Data
Jun. 6, 2006    (JP)    ............... 2006-156826

(51) Int. Cl.
*F16H 61/12*    (2010.01)
*F16H 61/688*    (2010.01)
(52) U.S. Cl. ............... 192/3.58; 192/3.61; 192/48.601; 192/85.63; 60/459
(58) Field of Classification Search ............... 192/3.61, 192/48.619
See application file for complete search history.

(56) References Cited

U.S. PATENT DOCUMENTS

| 4,380,278 A | * | 4/1983 | Lasken | ....................... 192/3.58 |
| 5,062,050 A |   | 10/1991 | Petzold et al. | |

FOREIGN PATENT DOCUMENTS

| JP | S58-150602 U | 10/1983 |
| JP | H03-134365 | 6/1991 |
| JP | 2002-310282 | 10/2002 |
| JP | 2006-046542 A | 2/2006 |
| JP | 2006134647 A | * 5/2006 |
| JP | 2007-270937 | 10/2007 |

OTHER PUBLICATIONS

An English translation of the Office Action of corresponding Japanese Application No. 2006-156826, dated Aug. 17, 2010.

* cited by examiner

*Primary Examiner*—Richard M. Lorence
(74) *Attorney, Agent, or Firm*—Global IP Counselors, LLP

(57) ABSTRACT

The hydraulic pressure control apparatus includes an upstream control valve, a downstream control valve, a hydraulic pressure sensor, and a controller. The upstream control valve is provided between a hydraulic pressure source and a hydraulic pressure device. The downstream control valve is disposed between the upstream control valve and the hydraulic pressure device. The hydraulic pressure sensor is configured and arranged to detect the hydraulic pressure on a downstream side of the downstream control valve. The controller is configured to control the upstream control valve and the downstream control valve based on an upstream pressure command value and a downstream pressure command value, respectively. The controller is further configured to detect an abnormality in the upstream control valve based on the hydraulic pressure detected by the hydraulic pressure sensor when the downstream pressure command value is set to be equal to or greater than the upstream pressure command value.

14 Claims, 7 Drawing Sheets

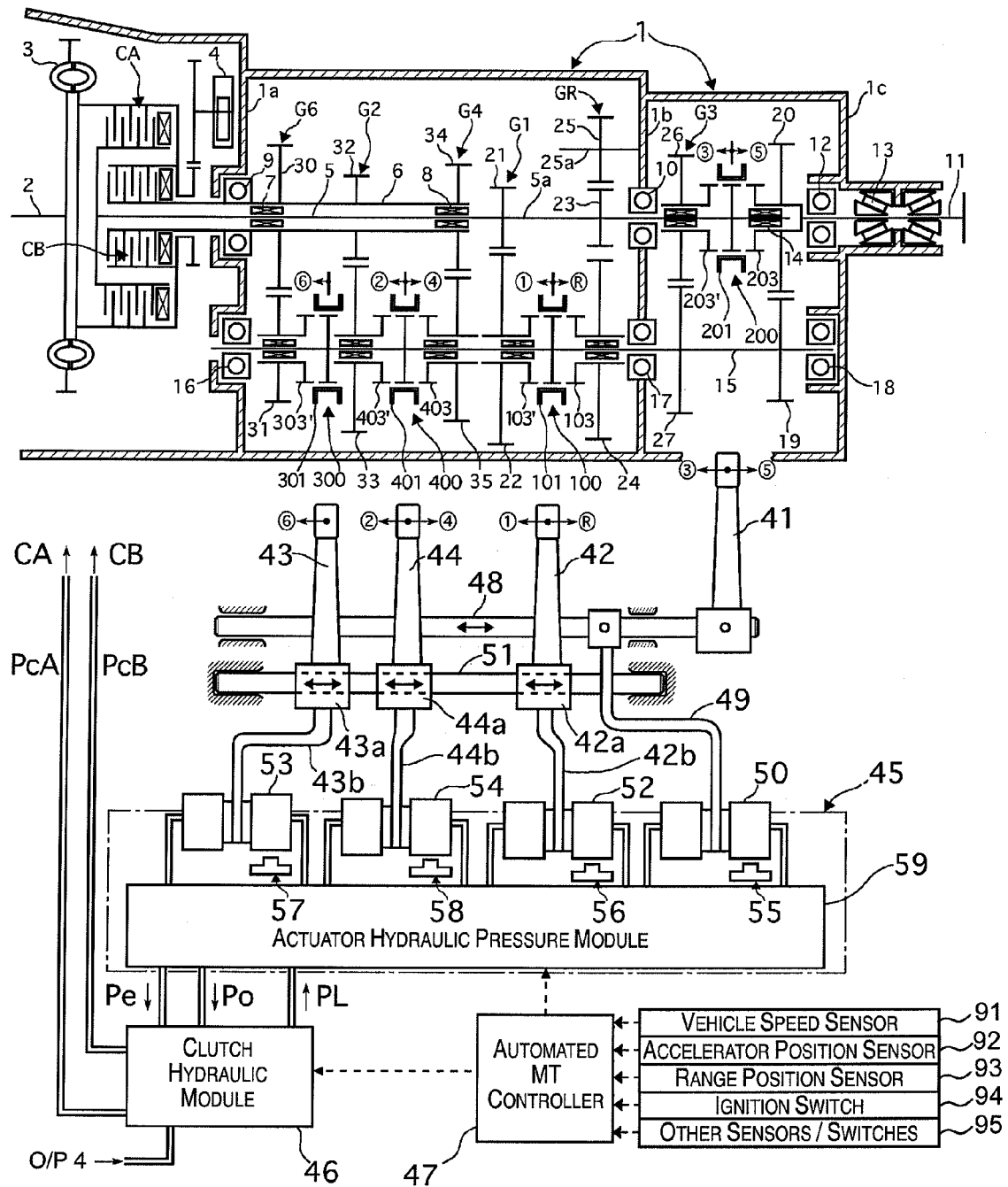
F I G. 1

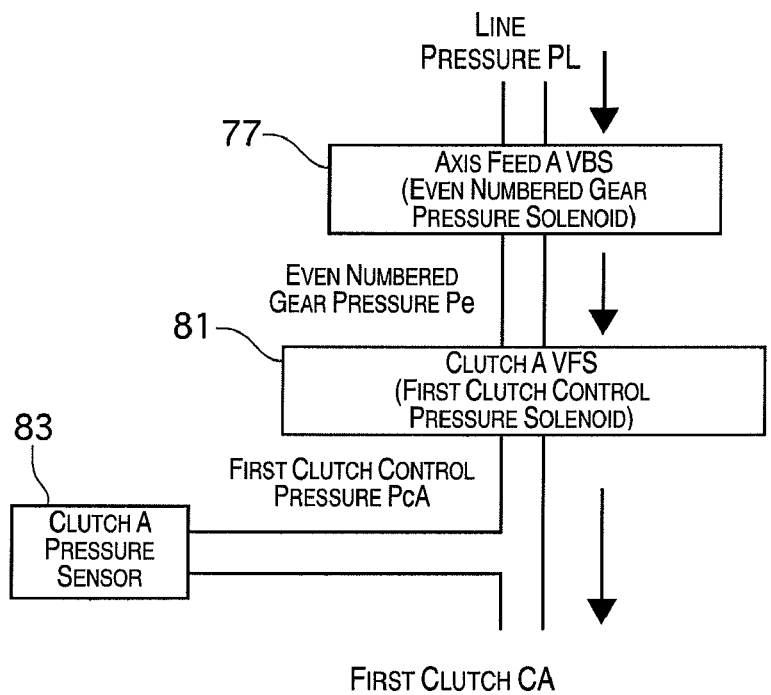
F I G. 4
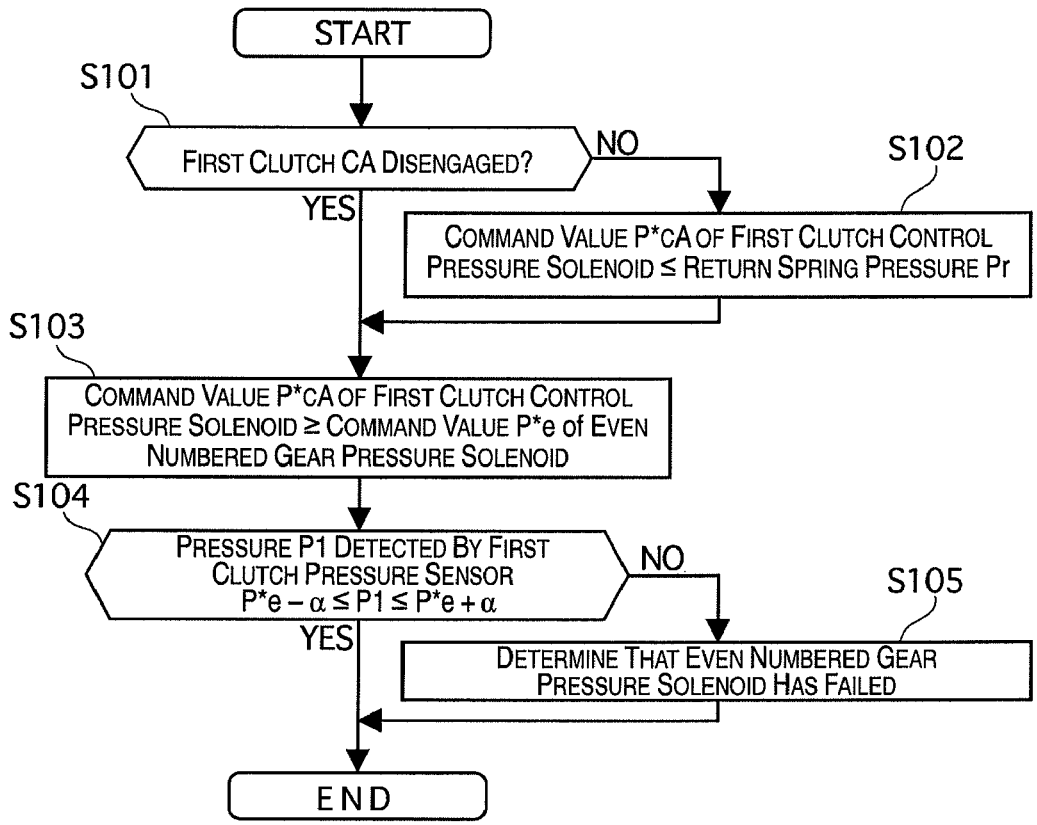
F I G. 5

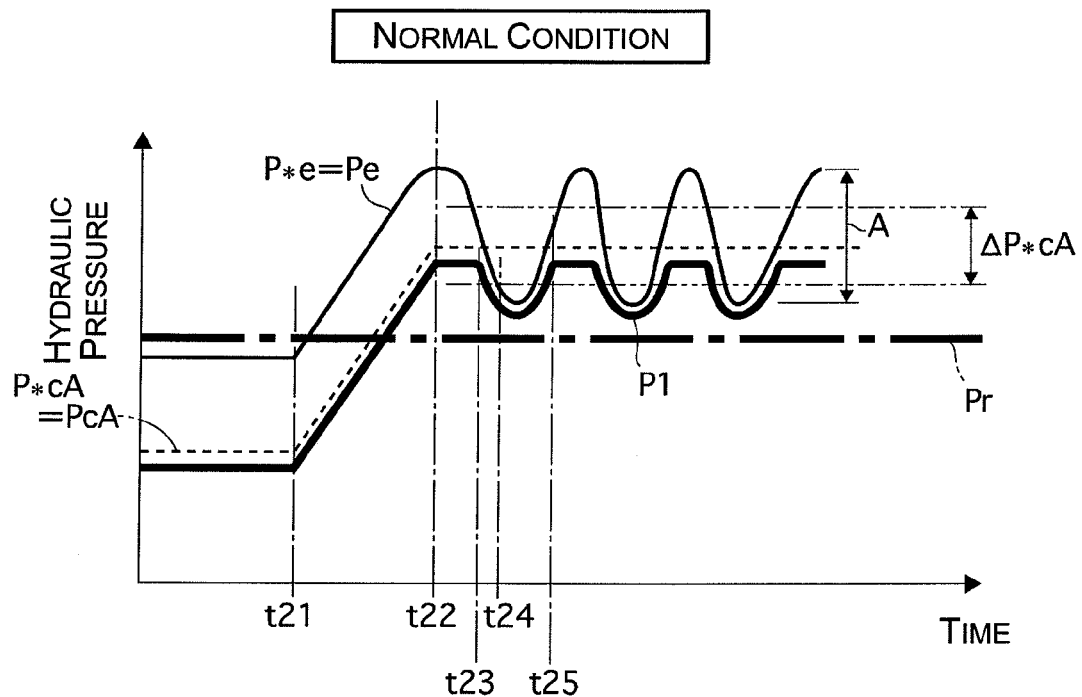
F I G. 9
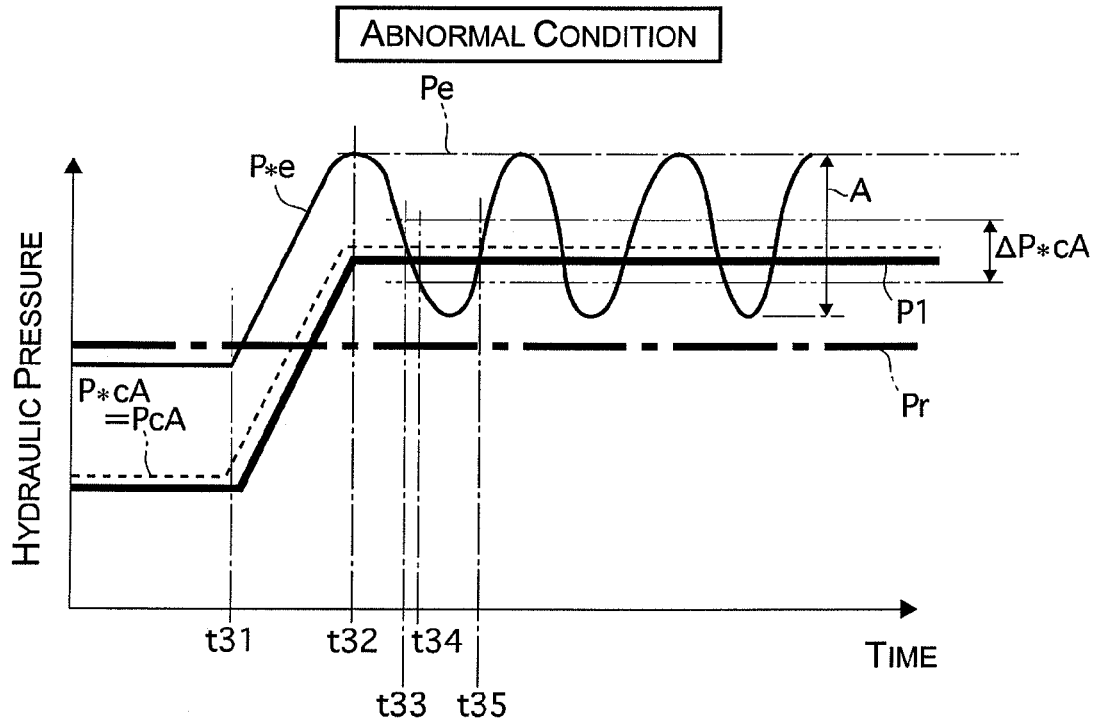
F I G. 10

HYDRAULIC PRESSURE CONTROL APPARATUS

CROSS-REFERENCE TO RELATED APPLICATIONS

This application claims priority to Japanese Patent Application No. 2006-156826, filed on Jun. 6, 2006. The entire disclosure of Japanese Patent Application No. 2006-156826 is hereby incorporated herein by reference.

BACKGROUND OF THE INVENTION

1. Field of the Invention

The present invention relates to a hydraulic pressure control apparatus configured and arranged to detect an abnormality in a control valve provided in a hydraulic circuit.

2. Background Information

Japanese Laid-Open Patent Application Publication No. 2006-46542 discloses a conventional hydraulic control apparatus that detects a hydraulic pressure at a downstream side of a control valve using a hydraulic pressure sensor to determine whether sticking and other abnormalities occur in the control valve.

In view of the above, it will be apparent to those skilled in the art from this disclosure that there exists a need for an improved hydraulic pressure control apparatus. This invention addresses this need in the art as well as other needs, which will become apparent to those skilled in the art from this disclosure.

SUMMARY OF THE INVENTION

When two control valves (first and second control valves) are connected in series with the second control valve being located between the hydraulic pressure sensor and the first control valve, which is a target valve to be inspected for an abnormality, problems have been encountered in that the abnormality in the first control valve cannot be detected by a hydraulic pressure sensor disposed downstream of the second control valve because a detected value of the hydraulic pressure sensor is influenced by an operation of the second control valve.

The present invention was devised in view of the aforementioned problems, and one object of the present invention is to provide a hydraulic pressure control apparatus configured and arranged to detect an abnormality in a target control valve even when an additional control valve or the like is provided between a hydraulic pressure sensor and the target control valve that is inspected for an abnormality.

In order to achieve the above mentioned object, a hydraulic pressure control apparatus is provided that is configured and arranged to control a hydraulic pressure of fluid supplied to a hydraulic pressure device from a hydraulic pressure source. The hydraulic pressure control apparatus includes an upstream control valve, a downstream control valve, a hydraulic pressure sensor, and a controller. The upstream control valve is provided between the hydraulic pressure source and the hydraulic pressure device. The downstream control valve is disposed in series with the upstream control valve between the upstream control valve and the hydraulic pressure device. The hydraulic pressure sensor is configured and arranged to detect the hydraulic pressure on a downstream side of the downstream control valve. The controller is configured to control the upstream control valve and the downstream control valve based on an upstream pressure command value and a downstream pressure command value, respectively. The controller is further configured to detect an abnormality in the upstream control valve based on the hydraulic pressure detected by the hydraulic pressure sensor when the downstream pressure command value of the downstream control valve is set to be equal to or greater than the upstream pressure command value of the upstream control valve.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 1 is an overall schematic diagram of a twin-clutch automated manual transmission to which a hydraulic pressure control apparatus is provided in accordance with a first embodiment of the present invention;

FIG. 4 is a schematic diagram of the hydraulic circuit in a first clutch system (even numbered gear system) of the hydraulic pressure control apparatus in accordance with the first embodiment of the present invention;

FIG. 5 is a flowchart showing a control flow of an abnormality detection control process in an upstream control valve of the hydraulic pressure control apparatus in accordance with the first embodiment of the present invention;

FIG. 9 is a time chart of the abnormality detection control when there is no abnormality in the upstream control valve of the hydraulic pressure control apparatus in accordance with the second embodiment of the present invention;

FIG. 10 is a time chart of the abnormality detection control when there is an abnormality in the upstream control valve of the hydraulic pressure control apparatus in accordance with the second embodiment of the present invention.

DETAILED DESCRIPTION OF THE PREFERRED EMBODIMENTS

Figure 2:
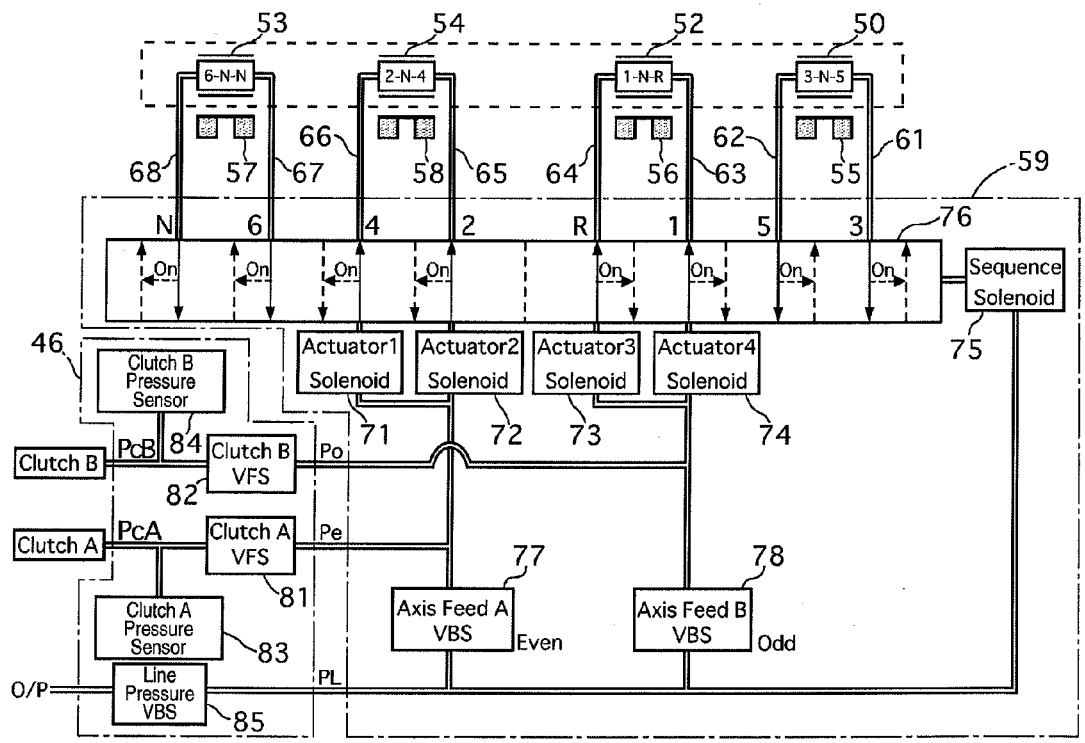
FIG. 2 is a schematic diagram of part of a hydraulic circuit for an actuator hydraulic pressure module and a clutch hydraulic pressure module of the hydraulic pressure control apparatus when a sequence solenoid is in an OFF state in accordance with the first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIG. 1, a twin-clutch (dual-clutch) automated manual transmission provided with a hydraulic pressure control apparatus is illustrated in accordance with a first embodiment of the present invention.

Overall Structure of Twin-Clutch Automated Manual Transmission

FIG. 1 is a schematic diagram showing an overall structure of the twin-clutch automated manual transmission provided with the hydraulic pressure control apparatus of the first embodiment of the present invention. The constituent features of the input section and input and output shafts of the twin-clutch automated manual transmission will now be explained.

Generally, a manual transmission is efficient and structurally simple. However, the manual transmission requires a driver to perform all operations for changing gears. An automated manual transmission is a transmission that retains the structure of a manual transmission while incorporating a mechanism to automate the gear changing operations.

With a conventional automated manual transmission, a clutch is disengaged temporarily in order to execute a change of gears and the resulting interruption of torque occurring during gear changing feels odd to a driver. The twin-clutch automated manual transmission was developed in order to alleviate this odd feeling and is provided with a second clutch in addition to the clutch provided on a conventional automated manual transmission. The twin-clutch automated manual transmission suppresses the torque interruption by reversing (switching) the engagement states of the two clutches (i.e., engaging one clutch and disengaging the other).

As shown in FIG. 1, the twin-clutch automated manual transmission includes a transmission case 1, a drive input shaft 2, a torsional damper 3, an oil pump 4 (hydraulic pressure source), a first transmission input shaft 5, a second transmission input shaft 6, a transmission output shaft 11, a counter shaft 15, an actuator unit 45 and a clutch hydraulic pressure module 46. The transmission further includes a first clutch CA (hydraulic device) and a second clutch CB (hydraulic device) arranged in an input section of the transmission. The first clutch CA is connected or engaged when one of a plurality of gear ranges (e.g., first speed, third speed, fifth speed and reverse) included in an odd number gear group is selected and the second clutch CB is engaged when one of a plurality of gear ranges (e.g., second speed, fourth speed, and sixth speed) included in an even number gear group is selected. The drive sides of both of the first and second clutches CA and CB are engaged to the drive input shaft 2 through the torsional damper 3 as shown in FIG. 1. The drive input shaft 2 is configured and arranged to receive a rotary drive force (torque) from an engine or other drive source that is connected to an input side of the drive input shaft 2.

When one of the odd numbered gear ranges is selected, the first clutch CA is engaged such that the driven side thereof transfers the rotary drive torque of the engine or other drive source to the first transmission input shaft 5. On the other hand, when one of the even numbered gear ranges is selected, the second clutch CB is engaged such that the driven side thereof transfers the rotary drive torque of the engine or other drive source to the second transmission input shaft 6. The first and second clutches CA and CB are operatively coupled to the clutch hydraulic pressure module 46 that will be explained in more detail below with reference to FIG. 1.

The oil pump 4 is driven by the drive source at all times and the oil discharged from the oil pump 4 serves as a hydraulic pressure source for controlling engagement and disengagement of the clutches CA and CB and for controlling selection of the gear ranges by operating the actuator unit 45. The excess oil from the oil pump 4 is delivered as lubricating oil to parts where lubrication is required.

As shown in FIG. 1, the second transmission input shaft 6 is arranged as a hollow shaft and the first transmission input shaft 5 is arranged as a solid shaft. The second transmission input shaft 6 is coaxially supported on the first transmission input shaft 5 with a front needle bearing 7 and a rear needle bearing 8 such that the second transmission input shaft 6 can rotate freely with respect to the first transmission input shaft 5.

Moreover, the second transmission input shaft 6 is supported on a ball bearing 9 such that the second transmission input shaft 6 can rotate freely with respect to a frontward end wall 1a of the transmission case 1 as shown in FIG. 1. The first transmission input shaft 5 includes a rearward end portion 5a that protrudes from the rearward end of the second transmission input shaft 6. The protruding rearward end portion 5a of the first transmission input shaft 5 passes through an intermediate wall 1b of the transmission case 1 and is supported on a ball bearing 10 such that the first transmission input shaft 5 can rotate freely with respect to the intermediate wall 1b.

The transmission output shaft 11 is arranged coaxially at the rearward end portion 5a of the first transmission input shaft 5. The transmission output shaft 11 is rotatably supported on a rear end wall 1c of the transmission case 1 with a tapered roller bearing 12 and an axial bearing 13 as shown in FIG. 1. The transmission output shaft 11 rotatably supports the rearward end portion 5a of the first transmission input shaft 5 through a needle bearing 14.

The counter shaft 15 is arranged parallel to the first transmission input shaft 5, the second transmission input shaft 6, and the transmission output shaft 11. The counter shaft 15 is rotatably supported on the frontward end wall 1a, the intermediate wall 1b, and the rear end wall 1c of the transmission case 1 with a plurality of roller bearings 16, 17, and 18, respectively.

As shown in FIG. 1, a gear changing mechanism of the twin-clutch automated manual transmission is arranged as a constant-mesh transmission having a synchromesh mechanism. The twin-clutch automated manual transmission has a plurality of gear sets (gear pairs) having different tooth count ratios to achieve a plurality of gear ranges (i.e., six forward gear ranges (speeds) and one reverse gear range in the example shown in FIG. 1).

More specifically, as shown in FIG. 1, the counter shaft 15 has a counter gear 19 provided integrally on the rearward end of the counter shaft 15. The transmission output shaft 11 includes an output gear 20 (toothed wheel). The counter gear 19 and the output gear 20 are meshed together such that the rotation of the counter shaft 15 is transmitted to the transmission output shaft 11. The counter gear 19 and the output gear 20 also constitute a gear set.

Moreover, a plurality of gear sets G1, G3 and GR of the odd numbered gear ranges (first speed, third speed, and reverse, respectively) is arranged between the rearward end portion 5*a* of the first transmission input shaft 5 and the counter shaft 15 such that the first speed gear set G1 is located the closest toward the front (the input side) of the transmission, the reverse gear set GR is located farther toward the rear (the output side), and the third speed gear set G3 is located still farther toward the rear.

The first speed gear set G1 includes a first speed input gear 21 provided on the rearward end portion 5*a* of the first transmission input shaft 5 and a first speed output gear 22 provided on the counter shaft 15. The first speed input gear 21 and the first speed output gear 22 are arranged so as to be intermeshed with each other.

The reverse gear set GR includes a reverse input gear 23 provided on the rearward end portion 5*a* of the first transmission input shaft 5, a reverse output gear 24 provided on the counter shaft 15, and a reverse idler gear 25 that meshes with both of the reverse input gear 23 and the reverse output gear 24. The reverse idler gear 25 is rotatably supported on a reverse idler shaft 25*a*. As shown in FIG. 1, the reverse idler shaft 25*a* is arranged to protrude from the intermediate wall 1*b* of the transmission case 1.

The third speed gear set G3 includes a third speed input gear 26 provided on rearward end portion 5*a* of the first transmission input shaft 5 and a third speed output gear 27 provided on the counter shaft 15. The third speed input gear 26 and the third speed output gear 27 are arranged so as to be intermeshed with each other.

A 1-R synchromesh mechanism 100 is provided on the counter shaft 15 between the first speed gear set G1 and the reverse gear set GR. The 1-R synchromesh mechanism 100 includes a coupling sleeve 101 and a pair of clutch gears 103' and 103. The clutch gear 103' is coupled to the first speed output gear 22 and the clutch gear 103 is coupled to the reverse output gear 24. When the coupling sleeve 101 of the 1-R synchromesh mechanism 100 is moved leftward (toward the input side) from the neutral position shown in FIG. 1 until a spline engagement is achieved with respect to the clutch gear 103', the rotation of the first speed output gear 22 can be transferred to the counter shaft 15 and the first speed can be selected. When the coupling sleeve 101 of the 1-R synchromesh mechanism 100 is moved rightward (toward the output side) from the neutral position shown in FIG. 1 until a spline engagement is achieved with respect to the clutch gear 103, the rotation of the reverse output gear 24 can be transferred to the counter shaft 15 and reverse can be selected.

A 3-5 synchromesh mechanism 200 is provided on the rearward end portion 5*a* of the first transmission input shaft 5 between the third speed gear set G3 and the output gear 20. The 3-5 synchromesh mechanism 200 includes a coupling sleeve 201 and a pair of clutch gears 203' and 203. The clutch gear 203' is coupled to the third speed input gear 26 and the clutch gear 203 is coupled to the output gear 20. When the coupling sleeve 201 of the 3-5 synchromesh mechanism 200 is moved leftward (toward the input side) from the neutral position shown in FIG. 1 until a spline engagement is achieved with respect to the clutch gear 203', the rotation of the third speed input gear 26 can be transferred to the first transmission input shaft 5 and the third speed can be selected. When the coupling sleeve 201 of the 3-5 synchromesh mechanism 200 is moved rightward (toward the output side) from the neutral position shown in FIG. 1 until a spline engagement is achieved with respect to the clutch gear 203, the rotation of the first transmission input shaft 5 can be transferred to the output gear 20 and the fifth speed can be selected.

A plurality of gear sets G2, G4 and G6 of the even numbered gear ranges (second speed, fourth speed, and sixth speed, respectively) is arranged between the second transmission input shaft 6 and the counter shaft 15 such that the sixth speed gear set G6 is located the closest toward the front (the input side) of the transmission, the second speed gear set G2 is located farther toward the rear (the output side), and the fourth speed gear G4 set is located still farther toward the rear.

The sixth speed gear set G6 includes a sixth speed input gear 30 provided on the second transmission input shaft 6 and a sixth speed output gear 31 provided on the counter shaft 15. The sixth speed input gear 30 and the sixth speed output gear 31 are arranged so as to be intermeshed with each other.

The second speed gear set G2 includes a second speed input gear 32 provided on the second transmission input shaft 6 and a second speed output gear 33 provided on the counter shaft 15. The second speed input gear 32 and the second speed output gear 33 are arranged so as to be intermeshed with each other.

The fourth speed gear set G4 includes a fourth speed input gear 34 provided on the second transmission input shaft 6 and a fourth speed output gear 35 provided on the counter shaft 15. The fourth speed input gear 34 and the fourth speed output gear 35 are arranged so as to be intermeshed with each other.

A 6-N synchromesh mechanism 300 is provided on the counter shaft 15 beside the sixth speed gear set G6. The 6-N synchromesh mechanism 300 includes a coupling sleeve 301 and a clutch gear 303'. The clutch gear 303' is coupled to the sixth speed output gear 31. When the coupling sleeve 301 of the 6-N synchromesh mechanism 300 is moved leftward (toward the input side) from the neutral position shown in FIG. 1 until a spline engagement is achieved with respect to the clutch gear 303', the rotation of the sixth speed output gear 31 can be transferred to the counter shaft 15 and the sixth speed can be selected.

A 2-4 synchromesh mechanism 400 is provided on the counter shaft 15 between the second speed gear set G2 and the fourth speed gear set G4. The 2-4 synchromesh mechanism 400 includes a coupling sleeve 401 and a pair of clutch gears 403' and 403. The clutch gear 403' is coupled to the second speed output gear 33 and the clutch gear 403 is coupled to the fourth speed output gear 35. When the coupling sleeve 401 of the 2-4 synchromesh mechanism 400 is moved leftward (toward the input side) from the neutral position shown in FIG. 1 until a spline engagement is achieved with respect to the clutch gear 403', the rotation of the second speed output gear 33 can be transferred to the counter shaft 15 and the second speed can be selected. On the other hand, when the coupling sleeve 401 of the 2-4 synchromesh mechanism 400 is moved rightward (toward the output side) from the neutral position shown in FIG. 1 until a spline engagement is achieved with respect to the clutch gear 403, the rotation of the fourth speed output gear 35 can be transferred to the counter shaft 15 and the fourth speed can be selected.

The 1-R synchromesh mechanism 100, the 3-5 synchromesh mechanism 200, the 6-N synchromesh mechanism 300 and the 2-4 synchromesh mechanism 400 are operatively coupled to the actuator unit 45.

Next, a control system for controlling engagement/disengagement of the gear range and selection of the gear range in the twin-clutch automated manual transmission equipped with the hydraulic pressure control apparatus device will now be explained in accordance with the embodiment of the present invention. As shown in FIG. 1, the control system includes to a 3-5 shift fork 41, a 1-R shift fork 42, a 6-N shift fork 43, a 2-4 shift fork 44, the actuator unit 45, the clutch hydraulic pressure module 46, and an automated manual transmission controller 47 (control unit). The actuator unit 45 includes a 3-5 shift actuator 50, a 1-R shift actuator 52, a 6-N shift actuator 53 and a 2-4 shift actuator 54 that are operatively coupled respectively to the 3-5 shift fork 41, the 1-R shift fork 42, the 6-N shift fork 43 and the 2-4 shift fork 44. Moreover, the actuator unit 45 further includes a 3-5 shift position sensor 55, a 1-R shift position sensor 56, a 6-N shift position sensor 57 and a 2-4 shift position sensor 58. The shift position sensors 55 to 58 preferably correspond to the detecting section of the present invention. The actuator unit 45 also includes an actuator hydraulic pressure module 59.

The 3-5 shift fork 41 engages with the coupling sleeve 201 of the 3-5 synchromesh mechanism 200. Moreover, the 3-5 shift fork 41 is fixedly coupled to a first shift rod 48. The first shift rod 48 is supported by the frontward end wall 1a and the intermediate wall 1b of the transmission case 1 in such a manner that the first shift rod 48 can move in the axial direction. A 3-5 shift bracket 49 is fixed to the first shift rod 48 and an end part of the 3-5 shift bracket 49 is movably supported on a spool coupling shaft of the 3-5 shift actuator 50. Thus, the 3-5 shift fork 41 is moved to the left (when third speed is selected) or right (when fifth speed is selected) from the neutral position shown in FIG. 1 in accordance with the spool operation of the 3-5 shift actuator 50.

The 1-R shift fork 42 engages with the coupling sleeve 101 of the 1-R synchromesh mechanism 100. The 1-R shift fork 42 is arranged on a second shift rod 51 in such a manner that the 1-R shift fork 42 can be moved along the axial direction with respect to the second shift rod 51. The second shift rod 51 is supported by the frontward end wall 1a and the intermediate wall 1b of the transmission case 1 in such a manner that the second shift rod 51 cannot move (is fixed) in the axial direction. The 1-R shift fork 42 has a bracket cylinder part 42a and a bracket arm part 42b that are formed as an integral unit. An end part of the bracket arm part 42b is movably supported on a spool coupling shaft of the 1-R shift actuator 52. Thus, the 1-R shift fork 42 is moved to the left (when first speed is selected) or right (when reverse is selected) from the neutral position shown in FIG. 1 in accordance with the spool operation of the 1-R shift actuator 52.

The 6-N shift fork 43 engages with the coupling sleeve 301 of the 6-N synchromesh mechanism 300. The 6-N shift fork 43 is arranged on the second shift rod 51 in such a manner that the 6-N shift fork 43 can be moved along the axial direction with respect to the second shift rod 51, which is fixed with respect to the transmission case 1. The 6-N shift fork 43 has a bracket cylinder part 43a and a bracket arm part 43b that are formed as an integral unit. An end part of the bracket arm part 43b is movably supported on a spool coupling shaft of the 6-N shift actuator 53. Thus, the 6-N shift fork 43 is moved to the left (when sixth speed is selected) from the neutral position shown in FIG. 1 in accordance with the spool operation of the 6-N shift actuator 53.

The 2-4 shift fork 44 engages with the coupling sleeve 401 of the 2-4 synchromesh mechanism 400. The 2-4 shift fork 44 is arranged on the second shift rod 51 in such a manner that the 2-4 shift fork 44 can be moved along the axial direction with respect to the second shift rod 51, which is fixed with respect to the transmission case 1. The 2-4 shift fork 44 has a bracket cylinder part 44a and a bracket arm part 44b that are formed as an integral unit. An end part of the bracket arm part 44b is movably supported on a spool coupling shaft of the 2-4 shift actuator 54. Thus, the 2-4 shift fork 44 is moved to the left (when second speed is selected) or right (when fourth speed is selected) from the neutral position shown in FIG. 1 in accordance with the spool operation of the 2-4 shift actuator 54.

The actuator unit 45 is fixedly coupled to the transmission case 1 at a prescribed position or positions (e.g., the lower, upper, lateral, or other positions in the transmission case 1). The actuator unit 45 is arranged as an integral unit including the 3-5 shift actuator 50, the 1-R shift actuator 52, the 6-N shift actuator 53, the 2-4 shift actuator 54, the 3-5 shift position sensor 55, the 1-R shift position sensor 56, the 6-N shift position sensor 57, the 2-4 shift position sensor 58, and the actuator hydraulic pressure module 59.

The actuator hydraulic pressure module 59 is configured and arranged to produce the even numbered gear pressure Pe and the odd numbered gear pressure Po based on the line pressure PL adjusted by the clutch hydraulic pressure module 46. The actuator hydraulic pressure module 59 is also configured and arranged to supply an actuator operating pressure to the respective gear change hydraulic oil passages leading to the shift actuators 50, 52, 53, and 54 in accordance with the selected gear (speed).

The clutch hydraulic pressure module 46 is configured and arranged to adjust the line pressure PL based on the oil discharged from the oil pump 4. The clutch hydraulic pressure module 46 is further configured and arranged to produce the clutch control pressure of the first clutch CA based on the even numbered gear pressure Pe from the actuator hydraulic pressure module 59 and to produce the clutch control pressure of the second clutch CB based on the odd numbered gear pressure Po.

The controller 47 is operatively coupled to a vehicle speed sensor 91, an accelerator pedal position sensor 92, a range position sensor 93, an ignition switch 94 and other sensors and switches 95 to receive information as shown in FIG. 1. The controller 47 is configured to send gear selection control commands to the valve solenoids of the actuator hydraulic pressure module 59. The controller 47 is also configured to issue clutch connection control commands (including line pressure control commands) to the valve solenoids of the clutch hydraulic pressure module 46.

Moreover, the controller 47 preferably includes a microcomputer with a solenoid abnormality detecting program that controls the twin-clutch automated manual transmission as discussed below. The controller 47 can also include other conventional components such as an input interface circuit, an output interface circuit, and storage devices such as a ROM (Read Only Memory) device and a RAM (Random Access Memory) device. The microcomputer of the controller 47 is programmed to control the actuator unit 45 and the clutch hydraulic pressure module 46. The memory circuit stores processing results and control programs such as ones for hydraulic pressure control operation that are run by the processor circuit. The controller 47 is operatively coupled to the actuator unit 45 and the clutch hydraulic pressure module 46 in a conventional manner. The internal RAM of the controller 47 stores statuses of operational flags and various control data. The internal ROM of the controller 47 stores the prescribed data and programs for various operations. The controller 47 is capable of selectively controlling any of the components of the control system in accordance with the control program. It will be apparent to those skilled in the art from this disclosure that the precise structure and algorithms for the controller 47 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 3:
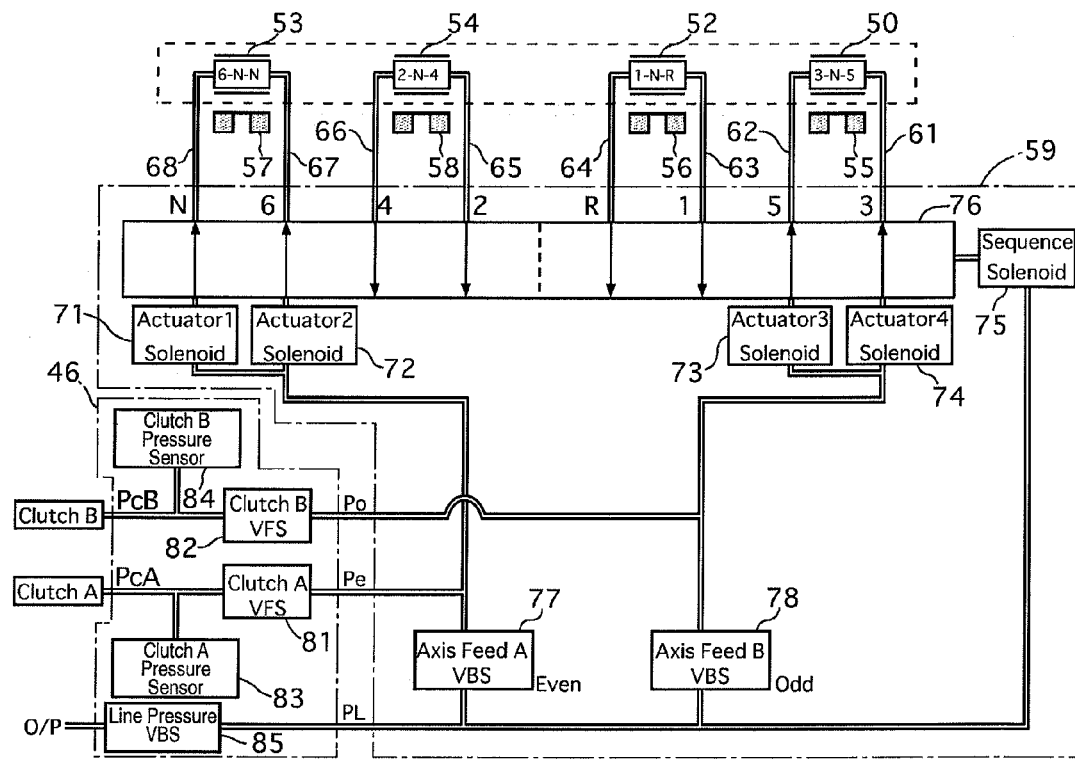
FIG. 3 is a schematic diagram of the hydraulic circuit for the actuator hydraulic pressure module and the clutch hydraulic pressure module of the hydraulic pressure control apparatus when the sequence solenoid is an ON state in accordance with the first embodiment of the present invention.

Referring now to FIGS. 2 and 3, a hydraulic circuit for the actuator hydraulic pressure module 59 and the clutch hydraulic pressure module 46 of the hydraulic pressure control apparatus of the first embodiment will now be explained in more detail. The actuator hydraulic pressure module 59 is arranged as an actuator hydraulic circuit that uses a plurality of actuator solenoids (e.g., four actuator solenoids 71, 72, 73 and 74 are used in this example) and a sequence solenoid 75 to open and close a plurality of oil passages (e.g., eight oil passages 61, 62, 63, 64, 65, 66, 67 and 68 are used in this example) for a plurality of shift actuators (e.g., four shift actuators 50, 52, 53 and 54 are used in this example).

FIG. 2 is a hydraulic circuit diagram for the actuator hydraulic pressure module 59 and the clutch hydraulic pressure module 46 of the hydraulic pressure control apparatus of the first embodiment showing a state in which the sequence solenoid 75 is in an OFF state. FIG. 3 is the hydraulic circuit diagram for the actuator hydraulic pressure module 59 and the clutch hydraulic pressure module 46 of the hydraulic pressure control apparatus of the first embodiment showing a state in which the sequence solenoid 75 is in an ON state.

The eight oil passages 61 to 68 include the third speed pressurized oil passage 61, the fifth speed pressurized oil passage 62, the first speed pressurized oil passage 63, the reverse pressurized oil passage 64, the second speed pressurized oil passage 65, the fourth speed pressurized oil passage 66, the sixth-speed pressurized oil passage 67, and the neutral pressurized oil passage 68.

The four actuator solenoids 71 to 74 include the first actuator solenoid 71 and the second actuator solenoid 72 configured and arranged to generate hydraulic pressure for the even numbered gear group, and the third actuator solenoid 73 and the fourth actuator solenoid 74 configured and arranged to generate hydraulic pressure for the odd numbered gear group.

As seen in FIG. 2, the sequence solenoid 75 has a spool 76 that is configured and arranged to enable a selection of low speed gear ranges, including first gear range and the reverse gear range (first speed, second speed, fourth speed, reverse), when the sequence solenoid 75 is in the OFF state. On the other hand, as shown in FIG. 3, the spool 76 is configured and arranged to disable the selection of the first gear range and the reverse gear range while a selection of high speed gear ranges (third speed, fifth speed, sixth speed) is enabled when the sequence solenoid 75 is in the ON state.

The actuator hydraulic pressure module 59 has an even numbered gear pressure solenoid 77 (axis feed A VBS) (upstream control valve or first control valve) and an odd numbered gear pressure solenoid 78 (axis feed B VBS) (upstream control valve or first control valve). The even numbered gear pressure solenoid 77 is configured and arranged to generate an even numbered gear pressure Pe for the first actuator solenoid 71 and the second actuator solenoid 72 based on the line pressure PL generated by the clutch hydraulic pressure module 46. The odd numbered gear pressure solenoid 78 is configured and arranged to generate an odd numbered gear pressure Po for the third actuator solenoid 73 and the fourth actuator solenoid 74 based on the line pressure PL generated by the clutch hydraulic pressure module 46. Each of the even numbered gear pressure solenoid 77 and the odd numbered gear pressure solenoid 78 are arranged as a VBS (variable bleed solenoid), which is a two-way valve.

The clutch hydraulic pressure module 46 has a line pressure solenoid 85 (line pressure adjustment valve), a first clutch control pressure solenoid 81 (downstream control valve or pressure changing device), a second clutch control pressure solenoid 82 (downstream control valve or pressure changing device), a first clutch pressure sensor 83 (hydraulic pressure sensor) and a second clutch pressure sensor 84 (hydraulic pressure sensor). The line pressure solenoid 85 is configured and arranged to adjust the line pressure PL based on the oil discharged from the oil pump 4. The first clutch control pressure solenoid 81 is configured and arranged to generate a clutch control pressure PcA for the first clutch CA based on the even numbered gear pressure Pe from the actuator hydraulic pressure module 59. The second clutch control pressure solenoid 82 is configured and arranged to generate a clutch control pressure PcB for the second clutch CB based on the odd numbered gear pressure Po. The first clutch pressure sensor 83 is configured and arranged to detect the hydraulic pressure between the first clutch CA and the first clutch control pressure solenoid 81, and the second clutch pressure sensor 84 is configured and arranged to detect the hydraulic pressure between the second clutch CB and the second clutch control pressure solenoid 82.

The line pressure solenoid 85 is preferably arranged as a VBS (variable bleed solenoid), which is a three-way valve. The first and second clutch control pressure solenoids 81 and 82 are preferably arranged as a VFS (variable force solenoid).

Solenoid Abnormality Detection Control

Referring now to FIG. 4, a solenoid abnormality detection control executed in the controller 47 will be explained in detail. In the solenoid abnormality detection control of the first embodiment of the present invention, the controller 47 is configured and arranged to detect an abnormality (e.g., a condition that prevents a normal operation of the valve such as sticking, valve failure, etc.) in the even numbered gear pressure solenoid 77 of the first clutch CA system or the odd numbered gear pressure solenoid 78 of the second clutch CB system based on the hydraulic pressure detected by the first clutch pressure sensor 83 or the second clutch pressure sensor 84. Since the solenoid abnormality detection controls executed for the first clutch CA system (the even numbered gear system) and the second clutch CB system (the odd numbered gear system) are identical, only the first clutch CA system is described in detail herein. FIG. 4 is a schematic diagram of a hydraulic circuit in the first clutch CA system.

As shown in FIG. 4, the even numbered gear pressure solenoid 77 and the first clutch control pressure solenoid 81 are arranged in series between the oil pump 4 and the first clutch CA as described above. The controller 47 is configured and arranged to adjust the line pressure PL to the even numbered gear pressure Pe by controlling the even numbered gear pressure solenoid 77 disposed on the upstream side based on an upstream pressure command value P*e (command pressure), and then to adjust the hydraulic pressure to the first clutch control pressure PcA by controlling the first clutch control pressure solenoid 81 disposed on the downstream side based on a downstream pressure command value P*cA (command pressure).

As shown in FIG. 4, the first clutch pressure sensor 83 (hydraulic pressure sensor) is not directly connected to the even numbered gear pressure solenoid 77 disposed on the upstream side. Instead, the first clutch pressure sensor 83 is connected via the first clutch control pressure solenoid 81 disposed on the downstream side (i.e., the first clutch pressure sensor 83 is disposed on the downstream side of the first clutch control pressure solenoid 81).

In this arrangement, when a change (drop) in pressure in the first clutch control pressure solenoid 81 on the downstream side is reduced to substantially zero, the actual first clutch control pressure PcA becomes substantially equal to the actual even numbered gear pressure Pe (PcA=Pe). In other words, when the drop in pressure in the first clutch control pressure solenoid 81 on the downstream side is substantially zero, the pressure of the oil passing through the first clutch control pressure solenoid 81 is not restricted by the first clutch control pressure solenoid 81. Therefore, the even numbered gear pressure Pe can be detected by the first clutch pressure sensor 83 disposed on the downstream side of the first clutch control pressure solenoid 81.

Thus, in the first embodiment of the present invention, if a detected pressure P1 detected by the first clutch pressure sensor 83 is generally equal to the command value P*e (upstream pressure command value) to the even numbered gear pressure solenoid 77 (P*e=P1) while the even numbered gear pressure Pe is substantially equal to the first clutch control pressure PcA, the even numbered gear pressure solenoid 77 can be determined to be operating normally (i.e., there is no abnormality in the even numbered gear pressure solenoid 77). When the detected pressure P1 is not generally equal to the command value P*e (P*e≠P1), it is determined that there is an abnormality in the even numbered gear pressure solenoid 77. In other words, the controller 47 is configured to determine that there is an abnormality in the even numbered gear pressure solenoid 77 when the detected pressure P1 detected by the first clutch pressure sensor 83 does not change in accordance with the command value P*e while the even numbered gear pressure Pe is substantially equal to the first clutch control pressure PcA.

Accordingly, with the first embodiment of the present invention, the drop in pressure in the first clutch control pressure solenoid 81 disposed on the downstream side is reduced to zero so that the even numbered gear pressure Pe caused by the even numbered gear pressure solenoid 77 on the upstream side is detected by the first clutch pressure sensor 83. Therefore, it is possible to detect the abnormality without directly connecting a hydraulic pressure sensor to the even numbered gear pressure solenoid 77.

Of course, an abnormality in the first clutch control pressure solenoid 81 can be detected directly based on a detected value of the first clutch pressure sensor 83. Therefore, with the first embodiment of the present invention, the abnormality in both of the even numbered gear pressure solenoid 77 and the first clutch control pressure solenoid 81 can be detected by a single sensor (i.e., the first clutch pressure sensor 83) that is disposed on the downstream side of the first clutch control pressure solenoid 81.

In order to reduce the drop in pressure in the first clutch control pressure solenoid 81 to zero in the first embodiment, the controller 47 is configured to set the command value P*e to the even numbered gear pressure solenoid 77 disposed on the upstream side to a lower value than the command value P*cA (downstream pressure command value) to the first clutch control pressure solenoid 81 disposed on the downstream side (P*e<P*cA).

Also, since the engagement force of the first clutch CA may vary, the pressure Pe of the even numbered gear pressure solenoid 77 may be affected if the first clutch CA is engaged and the command value P*e of the even numbered gear pressure solenoid 77 is set to be less than the command value P*cA of the first clutch control pressure solenoid 81 in order to detect an abnormality in the even numbered gear pressure solenoid 77. Furthermore, if an abnormality is to be detected while the first clutch CA is engaged, the even numbered gear pressure solenoid 77 cannot be completely turned off in order to produce a clutch engagement pressure, and thus, an abnormality in the even numbered gear pressure solenoid 77 cannot be detected in a completely OFF state. Therefore, in the first embodiment, the controller 47 is configured to set the command value P*cA of the first clutch control pressure solenoid 81 to be equal to or less than a return spring pressure Pr (a pressure required to engage the first clutch CA) of the first clutch CA during the abnormality detection control so that the first clutch CA is disengaged. More specifically, during the abnormality detection control, the controller 47 is configured to first set the command value P*cA of the first clutch control pressure solenoid 81 to be less than or equal to the return spring pressure Pr. Then, the controller 47 is configured to set the command value P*e of the even numbered gear pressure solenoid 77 to be less than the command value P*cA of the first clutch control pressure solenoid 81. The return spring pressure Pr of the first clutch CA is the pressure of a spring that pushes a pair of clutch plates of the first clutch CA to prescribed positions so that the clutch plates do not come into contact with each other while the hydraulic pressure is not being supplied to the first clutch CA.

Accordingly, with the first embodiment of the present invention, the abnormality in the even numbered gear pressure solenoid 77 can be detected without being affected by the engagement of the first clutch CA, and the abnormality in the even numbered gear pressure solenoid 77 can be detected while the even numbered gear pressure solenoid 77 is in the completely OFF state. Thus, the reliability of abnormality detection is improved in the present invention.

Alternatively, in cases in which the effect of variation in the engagement force of the first clutch CA on the actual even numbered gear pressure Pe of the even numbered gear pressure solenoid 77 during the abnormality detection can be ignored, and there is no need to detect the abnormality while the even numbered gear pressure solenoid 77 is in the completely OFF state, the controller 47 can be configured to set the command value P*cA of the first clutch control pressure solenoid 81 to be greater than the return spring pressure Pr. In such case, the abnormality in the even numbered gear pressure solenoid 77 can be detected while the first clutch CA is engaged.

Moreover, in cases in which when the command value P*e of the even numbered gear pressure solenoid 77 on the upstream side cannot be decreased by a large amount with respect to the command value P*cA of the first clutch control pressure solenoid 81 on the downstream side, the command value P*e of the even numbered gear pressure solenoid 77 may overlap the noise region of the command value P*cA of the first clutch control pressure solenoid 81. In such case, the first clutch pressure sensor 83 may mistakenly detect the hydraulic pressure corresponding to the command value P*cA of the first clutch control pressure solenoid 81 instead of the hydraulic pressure corresponding to the command value P*e of the even numbered gear pressure solenoid 77. Accordingly, the controller 47 can be configured to oscillate the command value P*e of the even numbered gear pressure solenoid 77 on the upstream side and to set the command value P*cA of the first clutch control pressure solenoid 81 on the downstream side within an amplitude of the command value P*e so that the command value P*e oscillates around the command value P*cA. Thus, a region in which the command value P*cA of the first clutch control pressure solenoid 81 is greater than the command value P*e of the even numbered gear pressure solenoid 77 can be reliably generated to prevent erroneous abnormality detection. Such alternative embodiment will be explained in more detail below as a second embodiment.

Upstream Solenoid Abnormality Detection Control Process

FIG. 5 is a flowchart showing a control flow of the abnormality detection control process for detecting an abnormality in the even numbered gear pressure solenoid 77 disposed on the upstream side. The control processing executed in each step is described hereinbelow.

In step S101, the controller 47 is configured to determine whether the first clutch CA is disengaged. If the first clutch CA is disengaged (Yes in step S101), then the controller 47 proceeds to step S103. If the first clutch CA is engaged (No in step S101), then the controller 47 proceeds to step S102.

In step S102, the controller 47 is configured to set the command value P*cA of the first clutch control pressure solenoid 81 to be less than or equal to the return spring pressure Pr (P*cA≦Pr). Thus, when the first clutch CA is determined to be engaged in step S101, the first clutch CA is disengaged in step S102. Then, the controller 47 proceeds to step S103.

In step S103, the controller 47 is configured to set the command value P*cA of the first clutch control pressure solenoid 81 to be equal to or greater than the first clutch solenoid command value P*e of the even numbered gear pressure solenoid 77 (P*cA≧P*e). Then, the controller 47 proceeds to step S104.

In step S104, the controller 47 is configured to determine whether or not the pressure P1 detected by the first clutch pressure sensor 83 is generally equal to the command value P*e of the even numbered gear pressure solenoid 77. More specifically, in step S104, the controller 47 is configured to determine whether the pressure P1 falls within a range from a value "P*e−α" to a value "P*e+α" (i.e., a region that has a prescribed deviation α above and below the command value P*e of the even numbered gear pressure solenoid 77). If the pressure P1 detected by the first clutch pressure sensor 83 is generally equal to the command value P*e of the even numbered gear pressure solenoid 77 (Yes in step S104), then the controller 47 ends this control cycle. If the pressure P1 detected by the first clutch pressure sensor 83 is not generally equal to the command value P*e of the even numbered gear pressure solenoid 77 (No in step S104), then the controller 47 proceeds to step S105.

In step S105, the controller 47 is configured to determine that the even numbered gear pressure solenoid 77 has failed (there is an abnormality in the even numbered gear pressure solenoid 77), then the controller 47 ends this control cycle.

Change Over Time in Upstream Solenoid Abnormality Detection Control

Figure 6:
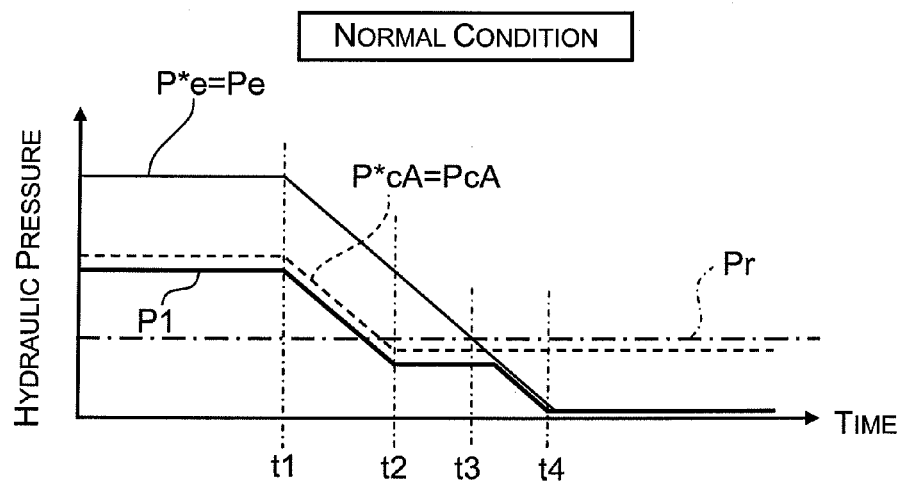
FIG. 6 is a time chart of the abnormality detection control when there is no abnormality in the upstream control valve of the hydraulic pressure control apparatus in accordance with the first embodiment of the present invention.
Figure 7:
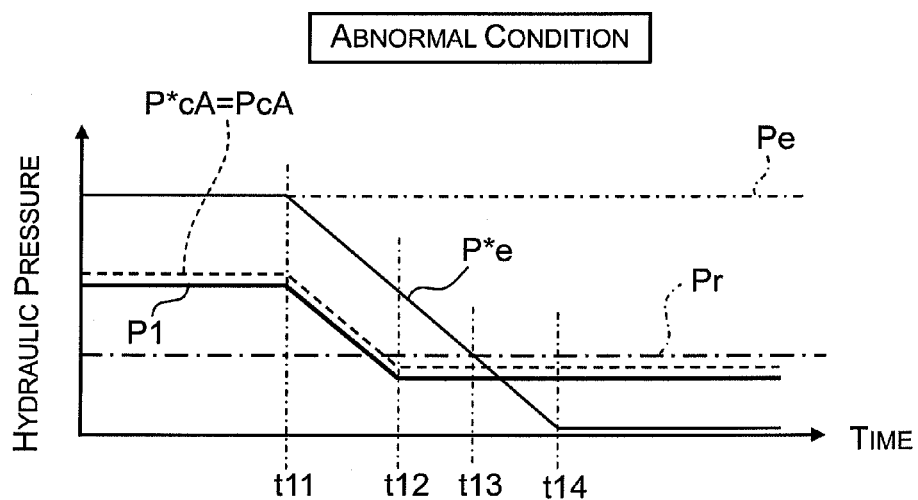
FIG. 7 is a time chart of the abnormality detection control when there is an abnormality in the upstream control valve of the hydraulic pressure control apparatus in accordance with the first embodiment of the present invention.

FIGS. 6 and 7 are time charts illustrating changes in the command values P*e and P*cA and the detected hydraulic pressure P1 in the first clutch CA system over time during the abnormality detection control for the even numbered gear pressure solenoid 77 disposed on the upstream side. More specifically, FIG. 6 shows a case in which there is no abnormality in the even numbered gear pressure solenoid 77 (normal condition), and FIG. 7 shows a case in which there is an abnormality in the even numbered gear pressure solenoid 77 (abnormal condition). A thinner single-dotted line in FIG. 7 represents an actual even numbered gear pressure Pe of the even numbered gear pressure solenoid 77.

First, the changes in the command values P*e and P*cA and the detected hydraulic pressure P1 over time when there is no abnormality in the even numbered gear pressure solenoid 77 will be explained with reference to FIG. 6.

At time t1 in FIG. 6, the command value P*e of the even numbered gear pressure solenoid 77 and the command value P*cA of the first clutch control pressure solenoid 81 begin to decrease. The pressure P1 detected by the first clutch pressure sensor 83 also begins to decrease at time t1 as shown in FIG. 6. Since there is no abnormality in the even numbered gear pressure solenoid 77 in this example illustrated in FIG. 6, the actual even numbered gear pressure Pe also decreases along with the command value P*e.

At time t2, the command value P*cA of the first clutch control pressure solenoid 81 decreases to a value equal to or less than the return spring pressure Pr, and then the command value P*cA is kept constant after time t2. Since the command value P*e of the even numbered gear pressure solenoid 77 disposed on the upstream side is greater than the command value P*cA of the first clutch control pressure solenoid 81 at this time, a value of the pressure P1 detected by the first clutch pressure sensor 83 substantially matches the command value P*cA disposed on the downstream side and is maintained substantially at a constant value.

At time t3, the command value P*e of the even numbered gear pressure solenoid 77 decreases to be equal to or less than the return spring pressure Pr. Moreover, the command value P*e falls below the return spring pressure Pr and decreases further. Since the even numbered gear pressure solenoid 77 on the upstream side does not have an abnormality in this example, the actual even numbered gear pressure Pe decreases in accordance with the decrease in the command value P*e.

Thus, when there is no abnormality in the even numbered gear pressure solenoid 77, both the actual even numbered gear pressure Pe of the even numbered gear pressure solenoid 77 (upstream solenoid) and the actual clutch control pressure PcA of the first clutch control pressure solenoid 81 (downstream solenoid) are equal to or less than the return spring pressure Pr, and the pressure P1 detected by the first clutch pressure sensor 83 is also equal to or less than the return spring pressure Pr.

At time t4, the command value P*e of the even numbered gear pressure solenoid 77 becomes substantially constant, and the detected pressure P1 also becomes substantially constant.

Next, the changes in the command values P*e and P*cA and the detected hydraulic pressure P1 over time when there is an abnormality in the even numbered gear pressure solenoid 77 will be explained with reference to FIG. 7.

At time t11, the command value P*e of the even numbered gear pressure solenoid 77 and the command value P*cA of the first clutch control pressure solenoid 81 begin to decrease, and the pressure P1 detected by the first clutch pressure sensor 83 also begins to decrease, similar to the case with no abnormality illustrated in FIG. 6. However, since there is an abnormality in the even numbered gear pressure solenoid 77, the actual even numbered gear pressure Pe (indicated by the thinner single-dotted line in FIG. 7) does not decrease.

At time t12, similar to time t2 in FIG. 6 when there is no abnormality, the command value P*cA of the first clutch control pressure solenoid 81 decreases to a value equal to or less than the return spring pressure Pr, and then the command value P*cA is kept constant after time t12. Since the command value P*e of the even numbered gear pressure solenoid 77 disposed on the upstream side is greater than the command value P*cA of the first clutch control pressure solenoid 81 at this time, a value of the pressure P1 detected by the first clutch pressure sensor 83 substantially matches the command value P*cA disposed on the downstream side and is maintained substantially at a constant value.

At time t13, the command value P*e of the even numbered gear pressure solenoid 77 decreases to a value equal to or less than the return spring pressure Pr. Moreover, the command value P*e falls below Pr and decreases further. However, since there is an abnormality in the even numbered gear pressure solenoid 77, the actual even numbered gear pressure Pe does not change after time t11 as shown in FIG. 7. Therefore, as in time t12, the actual even numbered gear pressure Pe of the even numbered gear pressure solenoid 77 is greater than the return spring pressure Pr and the downstream solenoid actual clutch control pressure PcA is less than the return spring pressure Pr. Thus, the detected pressure P1 remains at a substantially constant value from time t12.

Thus, when there is an abnormality in the even numbered gear pressure solenoid 77, the detected pressure P1 at time t13 remains substantially the same as the detected pressure P1 at time g12. Thus, the even numbered gear pressure solenoid 77 on the upstream side is determined to have an abnormality.

At time t14, the command value P*e of the even numbered gear pressure solenoid 77 becomes substantially constant. However, the detected pressure P1 does not change from the value observed at time t12 to t13.

Accordingly, with the hydraulic pressure control apparatus in accordance with the first embodiment, the controller 47 is configured to set the command value P*e of the even numbered gear pressure solenoid 77 (or the odd numbered gear pressure solenoid 78) to be less than the command value P*cA of the first clutch control pressure solenoid 81 (or the command value P*cB of the second clutch control pressure solenoid 82). The controller 47 is thereby configured to perform the abnormality detection control in which the abnormality in the even numbered gear pressure solenoid 77 (or the odd numbered gear pressure solenoid 78) is detected by the first clutch pressure sensor 83 (or the second clutch pressure sensor 84). Therefore, with the present invention, it is possible to detect the abnormality in the upstream control valve (e.g., the even numbered gear pressure solenoid 77 and the odd numbered gear pressure solenoid 78) without directly connecting a hydraulic pressure sensor to the upstream control valve. Since the first and second clutch control pressures PcA and PcB can be directly detected by the first and second clutch pressure sensors 83 and 84, respectively, the abnormalities in both the upstream control valve (the even numbered gear pressure solenoid 77 and the odd numbered gear pressure solenoid 78) and the downstream control valve (the first clutch control pressure solenoid 81 and the second clutch control pressure solenoid 82) can be detected with the aid of a single first clutch pressure sensor 83.

The hydraulic pressure device of the present invention includes the first clutch CA (or the second clutch CB). When the abnormality detection control is performed, the controller 47 is configured to set the command value P*cA of the first and second clutch control pressure solenoid 81 (or the command value P*cB of the second clutch control pressure solenoid 82) on the downstream side, respectively, to be equal to or less than the return spring pressure Pr of the first clutch CA (or the second clutch CB). Thus, it is ensured that no engagement force is generated in the first clutch CA (or the second clutch CB). Accordingly, the abnormality can be detected without being affected by the engagement of the first clutch CA (or the second clutch CB). Also, the abnormality can be detected in a state in which the even numbered gear pressure solenoid 77 (or the odd numbered gear pressure solenoid 78) is completely off, whereby the reliability of abnormality detection can be improved.

Second Embodiment

Figure 8:
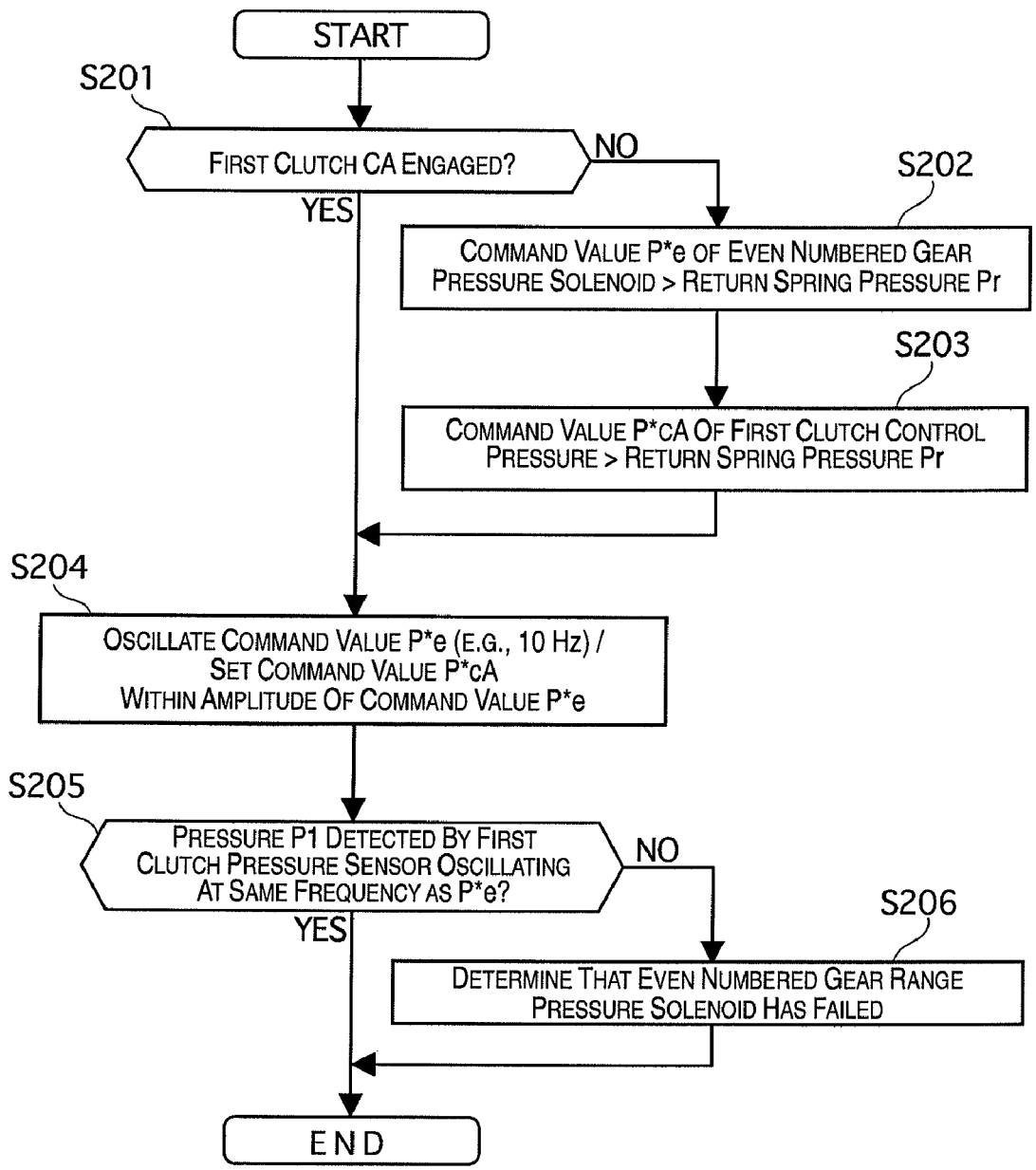
FIG. 8 is a flowchart showing a control flow of an abnormality detection control process in an upstream control valve of a hydraulic pressure control apparatus in accordance with a second embodiment of the present invention.

Referring now to FIGS. 8 to 10, a hydraulic pressure control apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The hydraulic pressure control apparatus of the second embodiment only differs from the hydraulic pressure control apparatus of the first embodiment in the abnormality detection control executed by the controller 47. Since the overall configuration of the hydraulic pressure control apparatus of the second embodiment is similar to that of the first embodiment, only the differences (i.e., the abnormality detection control) will be described.

When the abnormality in the upstream control valve (e.g., the even numbered gear pressure solenoid 77 and the odd numbered gear pressure solenoid 78) is detected in the first embodiment, the hydraulic pressure device (e.g., the first and second clutches CA and CB) is disengaged. On the other hand, in the second embodiment, the abnormality in the upstream control valve is detected while the hydraulic pressure device is engaged. Similarly to the first embodiment, only the first clutch CA system (the even numbered gear pressure solenoid 77) will be described in detail herein because the controls executed for the first clutch CA system and the second clutch CB system are identical.

Upstream Solenoid Abnormality Detection Control

In the first embodiment explained above, since the abnormality in the even numbered gear pressure solenoid 77 is detected after the first clutch CA is disengaged, the first clutch CA has to be disengaged every time the abnormality detection control is performed.

On the other hand, in the second embodiment, the abnormality is detected while the first clutch CA remains engaged. More specifically, in the second embodiment, the controller 47 is configured to set the command value P*e of the even numbered gear pressure solenoid 77 and the command value P*cA of the first clutch control pressure solenoid 81 to be equal to or greater than the return spring pressure Pr.

As in the first embodiment (from time t3 onward in FIGS. 6 and 7), the controller 47 can be configured to set the command value P*e of the even numbered gear pressure solenoid 77 on the upstream side to be less than the command value P*cA of the first clutch control pressure solenoid 81 so that the drop in pressure in the first clutch control pressure solenoid 81 is reduced to zero. However, in cases in which the command value P*e of the even numbered gear pressure solenoid 77 cannot be decreased by a large amount with respect to the command value P*cA of the first clutch control pressure solenoid 81, the command value P*e may overlap the noise region ΔP*cA of the command value P*cA. In such case, the first clutch pressure sensor 83 may mistakenly detect a pressure corresponding to the command value P*cA instead of a pressure corresponding to the command value P*e. In other words, the first clutch pressure sensor 83 may not be able to readily detect the even numbered gear pressure Pe caused by the even numbered gear pressure solenoid 77 for determining whether an abnormality exists in the even numbered gear pressure solenoid 77.

Therefore, in the second embodiment, the controller 47 is configured to oscillate the command value P*e of the even numbered gear pressure solenoid 77 on the upstream side within a prescribed range with a constant frequency. Also, the controller 47 is configured to set the command value P*cA of the first clutch control pressure solenoid 81 on the downstream side within the amplitude of the command value P*e. The prescribed range in which the command value P*e oscillates is set so that the command value P*e varies beyond the noise region ΔP*cA of the command value P*cA. The command value P*e thereby oscillates beyond the noise region ΔP*cA of the command value P*cA so that there will be times in which the command value P*e is greater than the command value P*cA and times in which the command value P*e is less than the command value P*cA, which occur alternately.

As in the first embodiment, when there is no abnormality in the even numbered gear pressure solenoid 77 on the upstream side, the actual even numbered gear pressure Pe is less than the clutch control pressure PcA in the region in which the command value P*e is less than the command value P*cA, and the drop in pressure in the first clutch control pressure solenoid 81 reaches zero. In this case, the actual even numbered gear pressure Pe of the even numbered gear pressure solenoid 77 on the upstream side can be detected by the first clutch pressure sensor 83.

Since the command value P*e of the even numbered gear pressure solenoid 77 on the upstream side oscillates with the constant frequency, variation in which the command value P*e extends beyond the noise region ΔP*cA of the command value P*cA oscillates with the same frequency as the command value P*e. The drop in pressure in the first clutch control pressure solenoid 81 thereby falls to zero, and the region in which the command value P*e is less than the command value P*cA (P*cA>P*e) also appears with the same frequency as the oscillation frequency of the command value P*e. In this region in which the command value P*e is less than the command value P*cA (P*cA>P*e), the even numbered gear pressure Pe can be detected by the first clutch pressure sensor 83 without being affected by the noise of the clutch control pressure PcA.

When there is no abnormality in the even numbered gear pressure solenoid 77 on the upstream side and when the command value P*cA is greater than the command value P*e (P*cA>P*e), the actual even numbered gear pressure Pe becomes greater than the actual clutch control pressure PcA. Therefore, the detected pressure P1 detected by the first clutch pressure sensor 83 is controlled (restricted) by the drop in pressure at the first clutch control pressure solenoid 81 on the downstream side. The detected pressure P1 detected by the first clutch pressure sensor 83 is thereby maintained in accordance with the command value P*cA on the downstream side.

Therefore, in cases in which there is no abnormality in the even numbered gear pressure solenoid 77 on the upstream side, the pressure P1 detected by the first clutch pressure sensor 83 oscillates with the same frequency as the oscillation frequency of the command value P*e on the upstream side in the region in which the command value P*e is less than the command value P*cA (P*cA>P*e). On the other hand, the pressure P1 detected by the first clutch pressure sensor 83 is maintained in accordance with the command value P*cA on the downstream side in the region in which the command value P*e is greater than the command value P*cA (P*e>P*cA).

On the other hand, when there is an abnormality in the even numbered gear pressure solenoid 77 has an abnormality, the detected pressure P1 is constantly kept in accordance with the command value P*cA, and thus, no oscillation of the detected pressure P1 is observed. Consequently, in the region in which the command value P*e is less than the command value P*cA (P*cA>P*e), the controller 47 is configured to determine that there is no abnormality in the even numbered gear pressure solenoid 77 on the upstream side when the detected pressure P1 detected by the first clutch pressure sensor 83 oscillates with the same frequency as the oscillation frequency of the command value P*e on the upstream side. If the detected pressure P1 is maintained without oscillating in the region in which the command value P*e is less than the command value P*cA (P*cA>P*e), the controller 47 is configured to determine that there is an abnormality in the even numbered gear pressure solenoid 77.

Upstream Solenoid Abnormality Detection Control Process

FIG. 8 is a flowchart showing a control flow of the abnormality detection control process for detecting an abnormality in the even numbered gear pressure solenoid 77 disposed on the upstream side. The control processing executed in each step is described hereinbelow.

In step S201, the controller 47 is configured to determine whether the first clutch CA is engaged. If the first clutch CA is engaged (Yes in step S201), then the controller 47 proceeds to step S204. If the first clutch CA is disengaged (No in step S201), then the controller proceeds to step S202.

In step S202, the controller 47 is configured to set the command value P*e of the even numbered gear pressure solenoid 77 to be greater than the return spring pressure Pr (P*e>Pr). Then, the controller 47 proceeds to step S203.

In step S203, the controller 47 is configured to set the command value P*cA of the first clutch control pressure solenoid 81 to be greater than the return spring pressure Pr (P*cA>Pr). Then, the controller 47 proceeds to step S204.

In step S204, the controller 47 is configured to oscillates the command value P*e of the even numbered gear pressure solenoid 77 at a prescribed frequency, for example, 10 Hz. Also, the controller 47 is configured to set the command value P*cA within an amplitude A of the command value P*e. Then, the controller 47 proceeds to step S205.

In step S205, the controller 47 is configured to determine whether the pressure P1 detected by the first clutch pressure sensor 83 is oscillating at the same frequency as the command value P*e (e.g., 10 Hz). If the pressure P1 detected by the first clutch pressure sensor 83 is oscillating at the same frequency as the command value P*e (Yes in step S205), then the controller 47 ends this control cycle. If the pressure P1 detected by the first clutch pressure sensor 83 is not oscillating at the same frequency as the command value P*e (No in step S205), then the controller 47 proceeds to step S206.

In step S206, the controller 47 is configured to determine that the even numbered gear pressure solenoid 77 has failed. Then, the controller 47 ends this control cycle.

Change Over Time in Upstream Solenoid Abnormality Detection Control

FIGS. 9 and 10 are time charts illustrating changes in the command values P*e and P*cA and the detected hydraulic pressure P1 in the first clutch CA system over time during the abnormality detection control for the even numbered gear pressure solenoid 77 disposed on the upstream side. More specifically, FIG. 9 shows a case in which there is no abnormality in the even numbered gear pressure solenoid 77 (normal condition), and FIG. 10 shows a case in which there is an abnormality in the even numbered gear pressure solenoid 77 (abnormal condition). A thinner single-dotted line in FIG. 7 represents an actual even numbered gear pressure Pe of the even numbered gear pressure solenoid 77.

First, the changes in the command values P*e and P*cA and the detected hydraulic pressure P1 over time when there is no abnormality in the even numbered gear pressure solenoid 77 will be explained with reference to FIG. 9.

At time t21, the command value P*e of the even numbered gear pressure solenoid 77 and the command value P*cA of the first clutch control pressure solenoid 81 begin to increase. Therefore, the pressure P1 detected by the first clutch pressure sensor 83 also begins to increase at time t21. Since there is no abnormality in the even numbered gear pressure solenoid 77 in this example shown in FIG. 9, the actual even numbered gear pressure Pe also increases along with the command value P*e.

At time t22, the command value P*e begins to oscillate with the amplitude A at the prescribed frequency (e.g., 10 Hz). The command value P*cA of the first clutch control pressure solenoid 81 on the downstream side is set within the amplitude A of the command value P*e of the even numbered gear pressure solenoid 77 on the upstream side. The amplitude A of the command value P*e is set so that the amplitude A includes the noise region ΔP*cA of the command value P*cA as shown in FIG. 9. Also, both of the command values P*e and P*cA are equal to or greater than the return spring pressure Pr, and thus, the first clutch CA is engaged.

Moreover, between time t21 and time t22, the actual even numbered gear pressure Pe of the even numbered gear pressure solenoid 77 on the upstream side is greater than the actual clutch control pressure PcA of the first clutch control pressure solenoid 81 on the downstream side (Pe>PcA), and the pressure P1 detected by the first clutch pressure sensor 83 is controlled (restricted) by the actual clutch control pressure PcA of the first clutch control pressure solenoid 81 on the downstream side. Therefore, the detected pressure P1 is kept in accordance with the command value P*cA on the downstream side.

At and after time t23, the command value P*e of the even numbered gear pressure solenoid 77 on the upstream side becomes equal to or less than the command value P*cA of the first clutch control pressure solenoid 81 on the downstream side. Therefore, the detected pressure P1 begins to decrease in accordance with the decrease in the command value P*e. At time t23, however, since the command value P*e is within the noise region ΔP*cA of the command value P*cA, it cannot be determined whether the detected pressure P1 indicates the actual even numbered gear pressure Pe on the upstream side or the actual clutch control pressure PcA on the downstream side At time t24, the command value P*e of the even numbered gear pressure solenoid 77 on the upstream side falls below a lower limit of the noise region ΔP*cA of the command value P*cA of the first clutch control pressure solenoid 81 on the downstream side. Therefore, the actual even numbered gear pressure Pe on the upstream side is detected as the detected pressure P1 at time T24.

At time t25, the command value P*e of the even numbered gear pressure solenoid 77 on the upstream side becomes equal to or greater than the command value P*cA of the first clutch control pressure solenoid 81 on the downstream side. Therefore, the detected pressure P1 is maintained in accordance with the command value P*cA of the first clutch control pressure solenoid 81 on the downstream side. After time t25, the change in the detected pressure P1 is repeated as in time t22 through time t25 as shown in FIG. 9.

Next, the changes in the command values P*e and P*cA and the detected hydraulic pressure P1 over time when there is an abnormality in the even numbered gear pressure solenoid 77 will be explained with reference to FIG. 10.

At time t31, the command value P*e of the even numbered gear pressure solenoid 77 and the command value P*cA of the first clutch control pressure solenoid 81 begin to increase, similar to the case with no abnormality illustrated in FIG. 9. Therefore, the pressure P1 detected by the first clutch pressure sensor 83 also begins to increase at time t21.

At time t32, the command value P*e begins to oscillate with the amplitude A at a prescribed frequency (e.g., 10 Hz). However, since there is an abnormality in the even numbered gear pressure solenoid 77 in this example illustrated in FIG. 10, the actual even numbered gear pressure Pe of the even numbered gear pressure solenoid 77 does not oscillate and does not change from the value in time t32. The actual even numbered gear pressure Pe on the upstream side is greater than the actual clutch control pressure PcA on the downstream side at time t32. Thus, the detected pressure P1 is maintained in accordance with the command value P*cA of the first clutch control pressure solenoid 81 on the downstream side.

At time t33, the command value P*e of the even numbered gear pressure solenoid 77 on the upstream side becomes equal to or less than the command value P*cA of the first clutch control pressure solenoid 81 on the downstream side. However, since the actual even numbered gear pressure Pe of the even numbered gear pressure solenoid 77 does not change from the value at time t32, and the actual even numbered gear pressure Pe is maintained to be greater than the actual clutch control pressure PcA as shown in FIG. 10. Therefore, the pressure P1 detected by the first clutch pressure sensor 83 is maintained in accordance with the command value P*cA of the first clutch control pressure solenoid 81 on the downstream side.

Moreover, the actual even numbered gear pressure Pe is maintained to be greater than the actual clutch control pressure PcA at time t34, time t35 and thereafter, as shown in FIG. 10. Therefore, the detected pressure P1 does not change from the same value at time t32.

With the hydraulic pressure control apparatus of the second embodiment, the similar effects in the first embodiment can be obtained. In addition, with the second embodiment, when the abnormality detection control is performed, the controller 47 is configured to set the command value P*e of the even numbered gear pressure solenoid 77 (or the odd numbered gear pressure solenoid 78) on the upstream side to be equal to or greater than the return spring pressure Pr, which is the engagement pressure of the first clutch CA (and the second clutch CB). Therefore, the first clutch CA (or the second clutch CB) does not have to be disengaged when the first clutch CA is engaged as in the first embodiment. Therefore, the abnormality detection control for the even numbered gear pressure solenoid 77 (or the odd numbered gear pressure solenoid 78) can be easily performed in the second embodiment.

Moreover, when the abnormality detection control is performed in the second embodiment, the controller 47 is configured to oscillate the command value P*e of the even numbered gear pressure solenoid 77 (or the odd numbered gear pressure solenoid 78) on the upstream side beyond the noise region ΔP*cA (or ΔP*cB) of the command value P*cA (P*cB) of the first clutch control pressure solenoid 81 (and the second clutch control pressure solenoid 82) on the downstream side. Therefore, the controller 47 can be prevented from mistakenly detecting the pressure corresponding to the command value P*cA as the actual even numbered gear pressure Pe. Therefore, the actual even numbered gear pressure Pe of the even numbered gear pressure solenoid 77 (or the odd numbered gear pressure solenoid 78) on the upstream side can be reliably detected by the first clutch pressure sensor 83 (or the second clutch pressure sensor 84) disposed on the downstream side of the first clutch control pressure solenoid 81 (or the second clutch control pressure solenoid 82) even in cases in which the command value P*e overlaps the noise region ΔP*cA of the command value P*cA. Thus, even when the command value P*e of the even numbered gear pressure solenoid 77 on the upstream side cannot be decreased by a large amount with respect to the command value P*cA of the first clutch control pressure solenoid 81 on the downstream side, the abnormality in the even numbered gear pressure solenoid 77 can be reliably detected by the first clutch pressure sensor 83.

Third Embodiment

Figure 11:
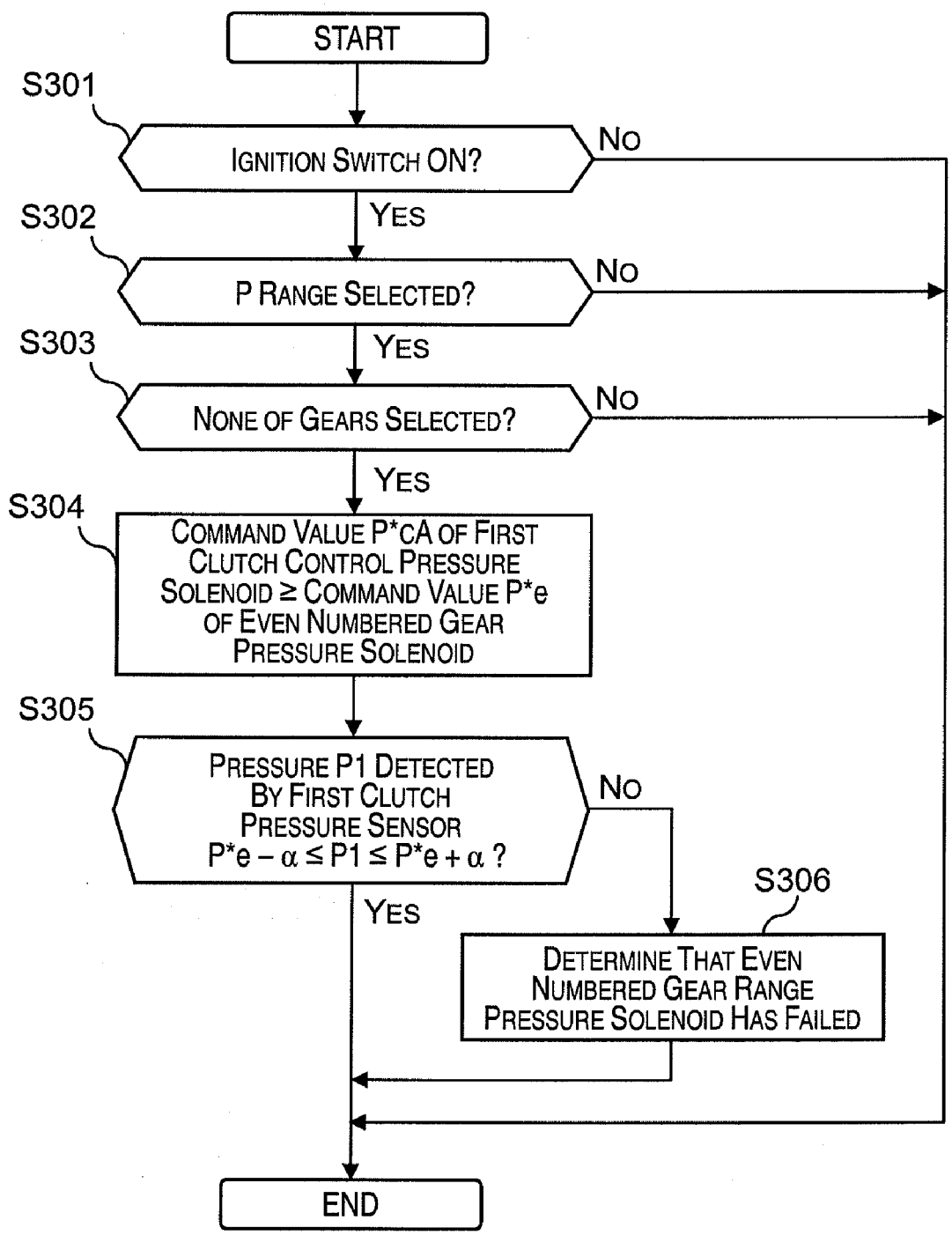
FIG. 11 is a flowchart showing a control flow of an abnormality detection control process in an upstream control valve of a hydraulic pressure control apparatus in accordance with a third embodiment of the present invention.

Referring now to FIG. 11, a hydraulic pressure control apparatus in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The hydraulic pressure control apparatus of the third embodiment only differs from the hydraulic pressure control apparatus of the first embodiment in the abnormality detection control executed by the controller 47. Since the overall configuration of the hydraulic pressure control apparatus of the third embodiment is similar to that of the first embodiment, only the differences (i.e., the abnormality detection control) will be described.

In the hydraulic pressure control apparatus of the third embodiment, the abnormality in the upstream control valve (e.g., the even numbered gear pressure solenoid 77 and the odd numbered gear pressure solenoid 78) is detected when the automated manual transmission (FIG. 1) is in the parking range and when none of the gear ranges is selected. Similarly to the first and second embodiments, only the first clutch CA system (the even numbered gear pressure solenoid 77) will be described in detail herein because the controls executed for the first clutch CA system and the second clutch CB system are identical.

Upstream Solenoid Abnormality Detection Control Process

FIG. 11 is a flowchart showing a control flow of the abnormality detection control process for detecting an abnormality in the even numbered gear pressure solenoid 77 disposed on the upstream side. The control processing executed in each step is described hereinbelow.

In step S301, the controller 47 is configured to determine whether the ignition switch 94 is turned on. More specifically, when the ignition switch 94 is turned on, an ON signal is sent to the controller 47. Thus, in step S301, the controller 47 is configured to determine whether the ON signal has been received from the ignition switch 94. If the ignition switch is turned ON (Yes in step S301), then the controller 47 proceeds to step S302. If the ignition switch is not turned ON (No in step S301), then the controller 47 ends this control cycle.

In step S302, the controller 47 is configured to determine whether the shift position is in the P range (parking range). More specifically, the range position sensor 93 is configured and arranged to detect the range position of the shift lever that is changed according to an operation of the shift lever of by a driver or the like. When the range position sensor 93 detects that the shift lever is in the parking range, a signal indicative of the parking range is sent to the controller 47. Thus, in step S302, the controller 47 is configured to determine whether the signal indicative of that the shift lever is in the P range has been received from the range position sensor 93. If the shift position is in the P range (Yes in step S302), then the controller 47 proceeds to step S303. If the shift position is not in the P range (No in step S302), then the controller 47 ends this control cycle.

In step S303, the controller 47 is configured to determine whether none of the gear ranges is selected in the automated manual transmission (i.e., whether all of the shift forks 41 to 44 (FIG. 1) are in the neutral positions). The positions of the shift forks 41 to 44 are detected by the shift position sensors 55 to 58 (FIG. 1) (gear sensors), respectively. More specifically, the shift position sensors 55 to 58 are configured and arranged to detect the positions of the shift actuators 50, 52, 53 and 54 (FIG. 1), and to detect the positions of the shift forks 41 to 44 based on the positions of the shift actuators 50, 52, 53 and 54, respectively. The position information of the shift forks 41 to 44 is sent from the shift position sensors 55 to 58 to the controller 47, and thus, the controller 47 is configured to determine whether the shift forks 41 to 44 are in the neutral positions based on the position information of the shift forks 41 to 44 received from the shift position sensors 55 to 58. If none of the gear ranges is selected (Yes in step S303), then the controller 47 proceeds to step S304. If one of the gear ranges is selected (i.e., if any one of the shift forks 41 to 44 is not in the neutral position) (No in step S303), then the controller 47 ends this control cycle.

In step S304, the controller 47 is configured to set the command value P*cA of the first clutch control pressure solenoid 81 to be equal to or greater than the first clutch solenoid command value P*e of the even numbered gear pressure solenoid 77 (P*cA≧P*e). Then, the controller 47 proceeds to step S305.

In step S305, the controller 47 is configured to determine whether or not the pressure P1 detected by the first clutch pressure sensor 83 is generally equal to the command value P*e of the even numbered gear pressure solenoid 77. More specifically, in step S305, the controller 47 is configured to determine whether the pressure P1 falls within a range from a value "P*e−α" to a value "P*e+α" (i.e., a region that has a prescribed deviation α above and below the command value P*e of the even numbered gear pressure solenoid 77). If the pressure P1 detected by the first clutch pressure sensor 83 is generally equal to the command value P*e of the even numbered gear pressure solenoid 77 (Yes in step S305), then the controller 47 ends this control cycle. If the pressure P1 detected by the first clutch pressure sensor 83 is not generally equal to the command value P*e of the even numbered gear pressure solenoid 77 (No in step S305), then the controller 47 proceeds to step S306.

In step S306, the controller 47 is configured to determine that the even numbered gear pressure solenoid 77 has failed (there is an abnormality in the even numbered gear pressure solenoid 77), then the controller 47 ends this control cycle.

Accordingly, in the hydraulic pressure control apparatus of the third embodiment, the abnormality detection control for the even numbered gear pressure solenoid 77 is performed when the ignition switch is turned ON, the shift lever is in the P range, and none of the gear ranges is selected.

Although the hydraulic pressure control apparatus of the present invention is described based on the first through third embodiments above, the present invention is not limited to the specific configurations of the illustrated embodiments. For example, although in the first embodiment, the abnormality detection control is performed after the first clutch CA (or the second clutch CB) is disengaged, the abnormality in the upstream control valve (e.g., the even numbered gear pressure solenoid 77 and the odd numbered gear pressure solenoid 78) may be detected while the first clutch CA (or the second clutch CB) is engaged by setting the command value P*cA to be greater than the return spring pressure Pr, when it is possible to ignore the effects of the engagement force variation in the first clutch CA (or the second clutch CB) on the actual even numbered gear pressure Pe of the upstream control valve and when there is no need to detect the abnormality when the upstream control valve is completely off.

Moreover, in the first embodiment, in cases in which when the command value P*e of the even numbered gear pressure solenoid 77 on the upstream side cannot be decreased by a large amount with respect to the command value P*cA of the first clutch control pressure solenoid 81 on the downstream side, the command value P*e of the even numbered gear pressure solenoid 77 may overlap the noise region of the command value P*cA of the first clutch control pressure solenoid 81. In such case, the first clutch pressure sensor 83 may mistakenly detect the hydraulic pressure corresponding to the command value P*cA of the first clutch control pressure solenoid 81 instead of the hydraulic pressure corresponding to the command value P*e of the even numbered gear pressure solenoid 77. Accordingly, the controller 47 can be configured, as in the second embodiment explained above, to oscillate the command value P*e of the even numbered gear pressure solenoid 77 on the upstream side and to set the command value P*cA of the first clutch control pressure solenoid 81 on the downstream side within an amplitude of the command value P*e so that the command value P*e oscillates around the command value P*cA. Thus, a region in which the command value P*cA of the first clutch control pressure solenoid 81 is greater than the command value P*e of the even numbered gear pressure solenoid 77 can be reliably generated to prevent erroneous abnormality detection.

Although, in the first to third embodiment, an example in which the hydraulic pressure control apparatus is applied to the automated manual transmission that uses an oil as fluid supplied to the hydraulic pressure device (e.g., the clutches). However, the present invention is not limited to the oil pressure control apparatus, and the present invention can also be applied to a water pressure control apparatus for controlling water pressure, and to other such apparatuses.

In the first to third embodiments, the hydraulic pressure control apparatus is applied to an automated manual transmission. However, the present invention is not limited to be applied to the automated manual transmission (or an automatic transmission), and the present invention can also be applied to any apparatus in which two or more hydraulic control valves are arranged in series.

In the first to third embodiments, the hydraulic pressure control apparatus is applied to the automated manual transmission in which the upstream control valve (e.g., the even numbered gear pressure solenoids 77 and the odd numbered gear pressure solenoid 78) and the downstream control valve (e.g., the first clutch control pressure solenoid 81 and the second clutch control pressure solenoid 82) are arranged in series. However, the present invention can also be applied to a system in which a pressure changing device such as a hydraulic accumulator or the like is used instead of the downstream control valve. In such cases, a mechanism for controlling the flow of fluid into the accumulator is preferably controlled by a controller. In such case, the controller is preferably configured to detect an abnormality in the upstream control valve (first control valve) based on the hydraulic pressure detected by the hydraulic pressure sensor in a prescribed condition in which the hydraulic pressure between the upstream control valve and the pressure changing device is substantially equal to the hydraulic pressure between the pressure changing device and the hydraulic pressure device. Such prescribed condition includes but not limited to, for example, when the accumulator is fluidly disconnected from a hydraulic circuit in which the upstream control valve is installed.

In the first to third embodiments, the hydraulic pressure control apparatus has a plurality of hydraulic circuits provided with the upstream control valves and the downstream control valves. However, the present invention is not limited to the illustrated embodiments, and the present invention can also be used in a hydraulic pressure control apparatus having a hydraulic circuit provided with a single upstream control valve and a single downstream control valve. Moreover, the present invention can also be used in a hydraulic pressure control apparatus having a hydraulic circuit provided with two or more upstream control valves and two or more downstream control valves.

Furthermore, in the first to third embodiments, the hydraulic pressure control apparatus is adapted to a system having the oil pump (hydraulic pressure source), the clutch (hydraulic pressure device), the upstream and downstream solenoids (upstream and downstream control valves), the pressure sensor, and the controller. However, the hydraulic pressure control apparatus can be formed solely as a controller unit. In such case, for example, the hydraulic pressure control apparatus is formed by control means for controlling the upstream and downstream solenoids (e.g., the even numbered gear pressure solenoid and the first clutch control pressure solenoid), the detecting means for detecting a hydraulic pressure downstream of the first clutch control pressure solenoid based on a signal from the first clutch pressure sensor, and the abnormality detection means for setting the command value for the even numbered gear solenoid to be less than the command value for the first clutch control pressure solenoid, and for detecting abnormalities in the even numbered gear solenoid based on the detected pressure downstream of the first clutch control pressure solenoid.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hydraulic pressure control apparatus configured and arranged to control a hydraulic pressure of fluid supplied to a hydraulic pressure device from a hydraulic pressure source, the hydraulic pressure control apparatus comprising:
   an upstream control valve provided between the hydraulic pressure source and the hydraulic pressure device;
   a downstream control valve disposed in series with the upstream control valve between the upstream control valve and the hydraulic pressure device;
   a hydraulic pressure sensor configured and arranged to detect the hydraulic pressure on a downstream side of the downstream control valve; and
   a controller configured to control the upstream control valve and the downstream control valve based on an upstream pressure command value and a downstream pressure command value, respectively, the controller being further configured to detect an abnormality in the upstream control valve based on the hydraulic pressure detected by the hydraulic pressure sensor when the downstream pressure command value of the downstream control valve is set to be equal to or greater than the upstream pressure command value of the upstream control valve.

2. The hydraulic pressure control apparatus according to claim 1, wherein
   the controller is further configured to oscillate the upstream pressure command value of the upstream control valve with a prescribed amplitude after the downstream pressure command value of the downstream control valve is set to be equal to or greater than the upstream pressure command value of the upstream control valve.

3. The hydraulic pressure control apparatus according to claim 2, wherein
   the controller is further configured to set the prescribed amplitude to include a noise region of the downstream control valve.

4. The hydraulic pressure control apparatus according to claim 1, wherein
   the controller is further configured to determine that there is the abnormality in the upstream control valve when the hydraulic pressure detected by the hydraulic pressure sensor does not change in accordance with the upstream pressure command value.

5. A transmission comprising:
   a hydraulic pressure device;
   a hydraulic source configured and arranged to supply fluid to the hydraulic pressure device; and
   a hydraulic pressure control apparatus configured and arranged to control a hydraulic pressure of the fluid supplied to the hydraulic pressure device from the hydraulic pressure source, the hydraulic pressure control apparatus including
      an upstream control valve provided between the hydraulic pressure source and the hydraulic pressure device,
      a downstream control valve disposed in series with the upstream control valve between the upstream control valve and the hydraulic pressure device,
      a hydraulic pressure sensor configured and arranged to detect the hydraulic pressure on a downstream side of the downstream control valve, and
      a controller configured to control the upstream control valve and the downstream control valve based on an upstream pressure command value and a downstream pressure command value, respectively, the controller being further configured to detect an abnormality in the upstream control valve based on the hydraulic pressure detected by the hydraulic pressure sensor when the downstream pressure command value of the downstream control valve is set to be equal to or greater than the upstream pressure command value of the upstream control valve.

6. The transmission according to claim 5, wherein
   the hydraulic pressure device includes a clutch, and
   the controller of the hydraulic pressure control apparatus is further configured to set the downstream pressure command value of the downstream control valve to be equal to or less than a pressure required to engage the clutch when the downstream pressure command value of the downstream control valve is set to be equal to or greater than the upstream pressure command value of the upstream control valve.

7. The transmission according to claim 5, wherein
   the hydraulic pressure device includes a clutch, and
   the controller of the hydraulic pressure control apparatus is further configured to set the upstream pressure command value of the upstream control valve to be greater than a pressure required to engage the clutch when the downstream pressure command value of the downstream control valve is set to be equal to or greater than the upstream pressure command value of the upstream control valve.

8. The transmission according to claim 7, wherein
   the controller of the hydraulic pressure control apparatus is further configured to oscillate the upstream pressure command value of the upstream control valve with a prescribed amplitude after the downstream pressure command value of the downstream control valve is set to be equal to or greater than the upstream pressure command value of the upstream control valve.

9. The transmission according to claim 8, wherein
the controller of the hydraulic pressure control apparatus is further configured to set the prescribed amplitude to include a noise region of the downstream control valve.

10. The transmission according to claim 5, further comprising
a gear sensor configured and arranged to detect whether none of the gear ranges of the transmission is selected,
the controller of the hydraulic pressure control apparatus is further configured to set the downstream pressure command value of the downstream control valve to be equal to or greater than the upstream pressure command value of the upstream control valve and to detect the abnormality in the upstream control valve based on the hydraulic pressure detected by the hydraulic pressure sensor when none of the gear ranges is selected.

11. The transmission according to claim 5, wherein
the controller of the hydraulic pressure control apparatus is further configured to determine that there is the abnormality in the upstream control valve when the hydraulic pressure detected by the hydraulic pressure sensor does not change in accordance with the upstream pressure command value.

12. A hydraulic pressure control apparatus configured and arranged to control a hydraulic pressure of fluid supplied to a hydraulic pressure device from a hydraulic pressure source, the hydraulic pressure control apparatus comprising:
a first control valve provided between the hydraulic pressure source and the hydraulic pressure device;
a pressure changing device disposed in series with the first control valve between the first control valve and the hydraulic pressure device;
a hydraulic pressure sensor configured and arranged to detect the hydraulic pressure between the pressure changing device and the hydraulic pressure device; and
a controller configured to control operations of the first control valve and the pressure changing device, the controller being further configured to detect an abnormality in the first control valve based on the hydraulic pressure detected by the hydraulic pressure sensor in a prescribed condition in which the hydraulic pressure between the first control valve and the pressure changing device is substantially equal to the hydraulic pressure between the pressure changing device and the hydraulic pressure device.

13. A hydraulic pressure control apparatus configured and arranged to control a hydraulic pressure of fluid supplied to a hydraulic pressure device from a hydraulic pressure source, the hydraulic pressure control apparatus comprising:
control means for controlling an upstream control valve provided between the hydraulic pressure source and the hydraulic pressure device based on an upstream pressure command value, and for controlling a downstream control valve provided between the upstream control valve and the hydraulic pressure device based on a downstream pressure command value;
detecting means for detecting the hydraulic pressure between the downstream control valve and the hydraulic pressure device; and
abnormality detection means for detecting an abnormality in the upstream control valve based on the hydraulic pressure detected by the detecting means when the downstream pressure command value of the downstream control valve from the control means is set to be equal to or greater than the upstream pressure command value of the upstream control valve.

14. A hydraulic pressure control method for controlling a hydraulic pressure of fluid supplied to a hydraulic pressure device from a hydraulic pressure source with an upstream control valve and a downstream control valve disposed in series between the hydraulic pressure source and the hydraulic pressure device, the hydraulic pressure control method comprising:
detecting the hydraulic pressure between the downstream control valve and the hydraulic pressure device when a downstream pressure command value of the downstream control valve is set to be equal to or greater than an upstream pressure command value of the upstream control valve; and
detecting an abnormality in the upstream control valve based on the hydraulic pressure detected.

* * * * *